United States Patent [19]

Yasuda et al.

[11] Patent Number: 4,881,456
[45] Date of Patent: Nov. 21, 1989

[54] ONBOARD AIR DISCHARGE SYSTEM

[75] Inventors: Tomio Yasuda, Kasukabe; Kohji Aoki; Kazuo Mori, both of Nagoya, all of Japan

[73] Assignee: Aisin Seiki Kabushikikaisha, Aichi, Japan

[21] Appl. No.: 162,104

[22] Filed: Feb. 29, 1988

[30] Foreign Application Priority Data

Mar. 5, 1987 [JP] Japan ............................ 62-50588

[51] Int. Cl.$^4$ .............................................. B60H 1/24
[52] U.S. Cl. ..................................... 98/2.01; 98/2.11; 98/2.15; 165/22; 165/41; 165/43
[58] Field of Search ...................... 98/2.01, 2.11, 2.14, 98/2.15, 2; 165/22, 41, 43; 307/105 B

[56] References Cited

U.S. PATENT DOCUMENTS

| | | | |
|---|---|---|---|
| 1,719,815 | 7/1929 | Thompson . | |
| 2,714,521 | 8/1955 | Graham | 292/144 |
| 2,924,265 | 10/1960 | Himka | 155/14 |
| 3,722,615 | 3/1973 | Okada et al. | 180/112 |
| 3,864,668 | 2/1975 | Bickford | 340/52 E |
| 3,871,474 | 3/1975 | Tomlinson et al. | 180/112 |
| 3,898,472 | 8/1972 | Long | 307/105 B |
| 3,912,939 | 10/1975 | Quantz et al. | 307/10 SB |
| 3,943,376 | 3/1976 | Long | 307/116 |
| 4,264,849 | 4/1981 | Fleischer et al. | 318/568 |
| 4,422,521 | 12/1983 | Mochida | 180/271 |
| 4,467,252 | 8/1984 | Takeda et al. | 318/603 |
| 4,657,105 | 4/1987 | Miyada | 180/274 |
| 4,669,780 | 6/1987 | Sakakibara et al. | 297/257 |
| 4,678,058 | 7/1987 | Wooters | 180/273 |
| 4,709,776 | 12/1987 | Metz | 180/281 |
| 4,719,775 | 1/1988 | Pross et al. | 70/264 |
| 4,722,550 | 2/1988 | Imaoka et al. | 280/727 |
| 4,730,120 | 3/1988 | Okada | 307/10 AT |
| 4,785,907 | 11/1988 | Aoki et al. | 180/274 |
| 4,805,723 | 2/1989 | Aoki et al. | 180/289 |

FOREIGN PATENT DOCUMENTS

| | | |
|---|---|---|
| 0191272 | 12/1985 | European Pat. Off. . |
| 3508515 | 9/1985 | Fed. Rep. of Germany . |
| 34-96369 | 6/1959 | Japan . |
| 55-95787 | 7/1980 | Japan . |
| 57-15008 | 1/1982 | Japan . |
| 57-138414 | 8/1982 | Japan . |
| 57-169528 | 10/1982 | Japan . |
| 57-186512 | 11/1982 | Japan . |
| 58-11275 | 1/1983 | Japan . |
| 58-16918 | 1/1983 | Japan . |
| 58-89429 | 5/1983 | Japan . |
| 58-146677 | 9/1983 | Japan . |
| 60-20206 | 2/1985 | Japan . |
| 60-88661 | 5/1985 | Japan . |
| 60-143164 | 7/1985 | Japan . |
| 174314 | 9/1985 | Japan ........................ 98/2.01 |
| 61-205523 | 9/1986 | Japan . |

Primary Examiner—Harold Joyce
Attorney, Agent, or Firm—Banner, Birch, McKie & Beckett

[57] ABSTRACT

An onboard air discharge system includes a first electrode mounted on each of a plurality of onboard seats of a vehicle. A second electrode is disposed in relation to each of the first electrodes such that at least part of a personnel who is seated upon a seat on which the first electrode is mounted is interposed between the both electrodes. The presence or absence of a personnel is detected for each seat on the basis of a change in the capacitance formed between the first and the second electrode. Air ejection toward the seat for which the absence of a personnel has been determined is inhibited. When a personnel is seated upon a seat, there occurs a large change in the capacitance formed between the first and the second electrode. Such change depends on the dielectric permittivity of a personnel, and hence is greatly different from a corresponding change which would occur when a baggage or the like is placed on the seat, thus enhancing the accuracy with which the presence or absence of a personnel on the seat is detected. The air ejection is controlled on such reliable information indicating the presence or absence of a personnel, and hence the efficiency of air ejection is improved with an increased reliability.

7 Claims, 16 Drawing Sheets 4,881,456

ONBOARD AIR DISCHARGE SYSTEM

BACKGROUND OF THE INVENTION

The invention relates to an air discharge system which is operative to discharge air into the compartment of an automobile.

An air conditioner for automobiles is known in the art which draws internal/external atmosphere and adjusts the temperature or humidity thereof before discharging it through an ejection grille which opens into the compartment in order to adjust the temperature or humidity thereof. In consideration of cooling/warming efficiency or air circulation efficiency, it is a general practice to divide an air discharge system into a plurality of sections including a section which directs the air toward the upper half of an occupant who is sitting on a seat and another which directs the air toward his legs. Certain air conditioners which are used for automobiles having a plurality of seats are provided with ejection grilles which are individually associated with the respective seats.

Considering an air conditioner which has an ejection grille associated with each seat, the operational efficiency is of a great importance. Assuming that a four occupant automobile, for example, which includes a front right-hand (hereafter abbreviated as FR), a front left-hand (hereafter abbreviated as FL), a rear right-hand (hereafter abbreviated as RR) and a rear left-hand (hereafter abbreviated as RL) seat, it will be readily seen that unless all of the four occupants seated upon their respective seats, there occurs a discharge of air upon at least one occupant who is actually absent. An ejection grille is normally provided with a fin assembly located on the front thereof which controls the direction of ejection or blocks the opening and which is manually operated. Accordingly, to stop the air ejection upon the absent occupant, another occupant must operate the fin assembly of such ejection grille manually.

To accommodate for such inconvenience, Japanese patent publication No. 20,206/1985 discloses an air conditioner including seating switches associated with the respective seats of an automobile so as to be turned on when they are loaded, the conditioner being operative to detect the presence or absence of an occupant on each seat on the basis of the on/off condition of the seating switches in order to drive a damper disposed within an air duct to control the air flow. With this arrangement, the discharge of air through an ejection grille which is associated with a seat on which no occupant is present is avoided, thus increasing the operational efficiency of the air conditioner.

However, in the air conditioner mentioned above, the use of a seating switch to detect the presence or absence of an occupant on the basis of a loading or weight applied to a seat causes a difficulty that the switch may be turned on if a baggage is placed on the seat. Thus, the seating switch is incapable of distinguishing between a personnel and a baggage, thus resulting in the discharge of air upon a baggage which is placed on the seat. Another problem relates to the durability of the seating switch caused by an excessive loading of the seat which might occur in the boarding process of an occupant or when a child occupant jumps up and down on the seat. If the switch is damaged to remain closed, there results a continued discharge of air upon the location of an occupant which is actually absent. Conversely, if the switch is destroyed in its off condition, no discharge of air upon an actual occupant cannot be achieved.

It is an object of the invention to achieve an increased efficiency of an air discharge system by controlling the discharge operation on the basis of reliable information concerning the presence or absence of an occupant.

SUMMARY OF THE INVENTION

The above object is accomplished in accordance with the invention by an onboard air discharge system for use with a vehicle having a plurality of seats, comprising a first electrode mounted on each seat, a second electrode for defining a capacitance with each of the first electrodes so that a personnel seating on the seat on which the first electrode is mounted is interposed between these electrodes, and means for monitoring the capacitance to detect the presence or absence of a personnel on each seat depending on a manner in which a change in the capacitance occurs, thus inhibiting an air discharge upon a seat for which the absence of a personnel is determined.

It will be appreciated that the capacitance formed between the first and the second electrode undergoes a great variation depending on the presence or absence of a personnel. Because the physical body of a man exhibits a high dielectric permittivity, the manner in which the capacitance changes when a personnel is seated upon the seat is greatly different from a corresponding manner which occurs when a baggage or the like is placed thereon. Accordingly, by monitoring the capacitance formed between these electrodes, the presence or absence of a personnel can be reliably detected. Since the detection takes place in a non-contact manner, an excellent durability and high reliability are achieved. Since the air discharge is controlled in accordance with such detection, the reliability and the efficiency of an air discharge system can be improved in accordance with the invention.

Other objects and features of the invention will become apparent from the following description of an embodiment thereof with reference to the drawings.

BRIEF DESCRIPTION OF THE DRAWINGS

FIG. 2b is a cross section taken along the line IIB—IIB shown in FIG. 2a;

FIG. 2c is a cross section taken along the line IIC—IIC shown in FIG. 2a;

FIG. 2d is a cross section taken along the line IID—IID shown in FIG. 2a;

FIG. 4 is a block diagram of an occupant detector unit 2a associated with a front, right-hand seat ST1 shown in FIG. 3a;

FIG. 6b is a cross section taken along the line VIB—VIB of a seat cushion SC1 shown in FIG. 6a;

FIG. 7 is a graphical illustration of the principle of detecting an occupant by using a microcomputer 1 shown in FIG. 3a; and FIGS. 8, 9a, 9b, 9c, 9d, 9e and 10 are flowcharts illustrating the operation performed by the microcomputer 1 shown in FIG. 3a.

EMBODIMENT

Figure 1:
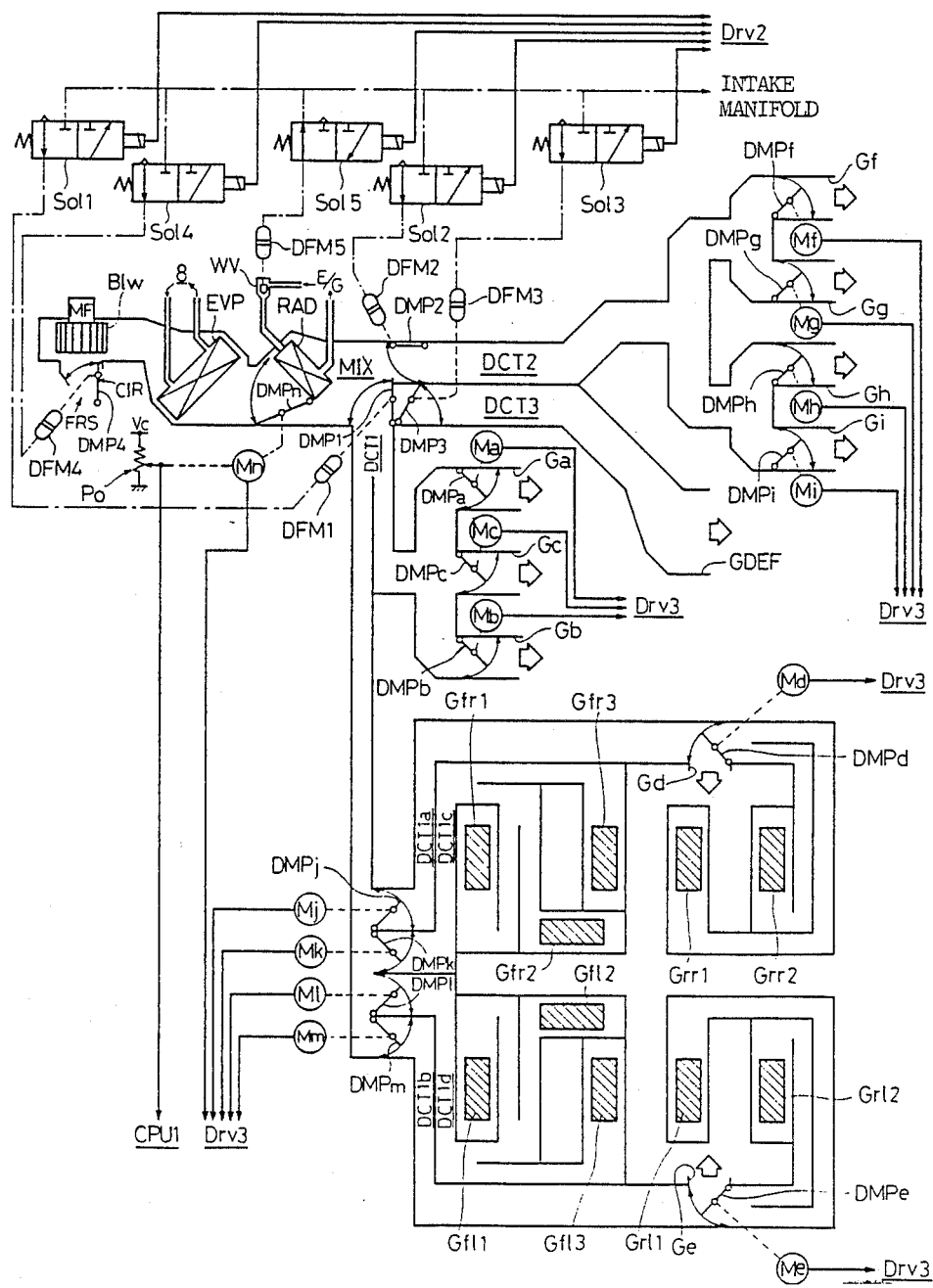
FIG. 1 is a block diagram of an air supply system for an air conditioner associated with a four occupant automobile according to one embodiment of the invention.

FIG. 1 is a block diagram of an air supply system for an air conditioner associated with a four occupant automobile in which one embodiment of the invention is incorporated. As shown, the air conditioner includes a blower Blw delivering an air flow, which is cooled down by an evaporator EVP and heated up by a radiator RAD to produce an air stream of an appropriate temperature in an air mix chamber MIX, which feeds a plurality of air ducts DCT1, DCT2 and DCT3, each communicating with individual air ejection grilles.

The air suction of the blower Blw takes place in two modes, namely, a fresh mode and a circulation mode, and a suction damper DMP4 assumes different positions depending on the mode chosen. The damper is shown in its position which it assumes during the fresh mode. Under this condition, the blower Blw draws an external atmosphere or the atmosphere outside the automobile (which is indicated by an arrow FRS) and discharges it into the compartment of the automobile. In the circulation mode, the suction damper DMP4 is rotated counter-clockwise, whereby the blower Blw draws the internal air or the air inside the compartment, which is indicated by an arrow CIR. The damper DMP4 is driven by a negative pressure diaphragm DFM4. A negative pressure system is indicated in phantom lines in FIG. 1, and when a solenoid valve Sol4 is deenergized, the atmospheric pressure is applied to the diaphragm DFM4 while when energized, a negative pressure from an intake manifold of an engine is applied to the diaphragm DFM4. Thus, when the solenoid valve Sol4 is energized, the damper DMP4 is driven counter-clockwise to establish the circulation mode. When the solenoid valve Sol4 is deenergized, the damper DMP4 returns to the position shown, establishing the fresh mode. The evaporator EVP is connected to a cooler unit (shown at 8 in FIG. 3) including a compressor and a condenser, which are not shown.

Coolant for an engine (shown as E/G) circulates through the radiator RAD. The flow of the coolant is controlled by a water valve WV which is driven by a negative pressure diaphragm DFM5. A negative pressure from the intake manifold of the engine is applied to the diaphragm DFM5 when a solenoid valve Sol5 is deenergized, and the atmospheric pressure is applied to the diaphragm when the valve Sol5 is energized. Thus, the deenergization of the valve Sol5 causes the diaphragm DFM5 to open the water valve WV while the energization of the valve Sol5 causes the diaphragm DFM5 to close the valve WV.

An air mix damper DMPn produces a mixture of cold and hot air at a given mixture ratio. In the position shown, it provides a maximum amount of hot air, and the amount of cold air is increased as the damper DMPn moves clockwise. The damper DMPn is driven by a motor Mn. The motor Mn is mechanically interlocked with a potentiometer Po, which provides an output voltage (to be delivered to a microcomputer 1 as will be described later) which corresponds to the opening of the damper DMPn.

The air conditioner has an ejection mode which may be either a face mode in which a flow of air is directed toward the upper half of an occupant, a foot mode directing the air flow toward the legs and a defroster mode directing the air flow toward the front glass pane.

In the face mode, a damper DMP1 is brought to its open condition, whereby the air mix chamber MIX communicates with an air duct DCT1. The damper DMP1 is driven by a negative pressure diaphragm DFM1, which closes and opens the damper DMP1 when a negative and a positive pressure is applied thereto, respectively. A switching between the negative pressure or the atmospheric pressure supplied to the diaphragm DFM1 is made by a solenoid valve Sol1. Thus, when the solenoid is deenergized, the atmospheric pressure is applied to the diaphragm DFM1 while when the solenoid is energized, the negative pressure from the intake manifold of the engine is applied to the diaphragm DFM1. Accordingly, the solenoid Sol1 is deenergized during the face mode.

Figure 2A:
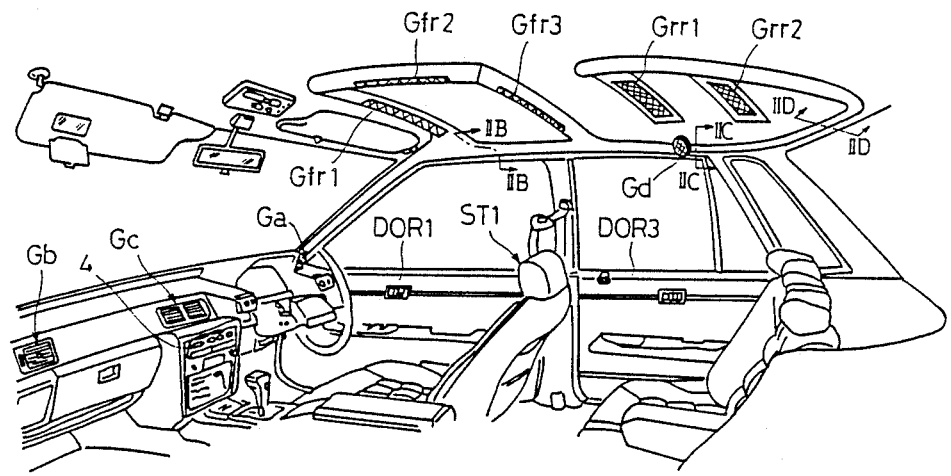
FIG. 2a is a fragmentary perspective view of an automobile on which the embodiment is incorporated, illustrating the interior thereof.

The air duct DCT1 is internally branched into a plurality of paths, one of which opens into an FL face grille Ga corresponding to the FR seat, an FL face grille Gb corresponding to the FL seat and a center grille Gc. Dampers DMPa, DMPb and DMPc are disposed within the air duct in association with the grilles Ga, Gb and Gc, respectively, thus controlling the ejection of air from the respective grilles. Thus, when the damper DMPa is open, an air ejection through the grille Ga takes place. An air ejection similarly occurs through the grille Gb or Gc when the damper DMPb or DMPc is open. The dampers DMPa to DMPc are driven by motors Ma to Mc, respectively. An arrangement of the respective grilles Ga, Gb and Gc within the vehicle is illustrated in FIG. 2a.

The other path of the air duct DCT1 branches into air ducts DCT1a, DCT1b, DCT1c and DCT1d, each of which is associated with a damper DMPj, DMPk, DMPl and DMPm, respectively, at the junction with the path, thus controlling the air flow therethrough, with these dampers being driven by motors Mj, Mk, Ml and Mm, respectively.

Located within the air duct DCT1a are an RR face grille Gd and RR head grilles Grr1 and Grr2 corresponding to the RR seat. Also located within the air duct DCT1a is a damper DMPd in association with the grille Gd and which is adapted to be driven by a motor Md. Thus, when the dampers DMPj and DMPd are open, the air ejection through the grille Gd takes place. When the damper DMPj is open while the damper DMPd is closed, the air ejection through the grilles Grr1 and Grr2 takes place.

Located within the air duct DCT1b are an RL face grille Ge and RL head grilles Grl1 and Grl2 corresponding to the RL seat, and also located within the air duct DCT1b is a damper DMPe in association with the grille Ge and which is adapted to be driven by a motor Me. Thus, when the dampers DMPm and DMPe are open, the ejection through the grille Ge takes place, and when the damp DMPm is open but the damper DMPe is closed, the air ejection through the grilles Grl1 and Grl2 takes place.

Opening into the air duct DCT1c are FR head grilles Gfr1, Gfr2 and Gfr3 corresponding to the FR seat. Thus, when the damper DMPk is open, the air ejection through the head grilles Gfr1 to Gfr3 takes place. Opening into the air duct DCT1d are FL head grilles Gfl1, Gfl2 and Gfl3 corresponding to the FL seat. Thus, when the damper DMPl is open, the air ejection through these head grilles Gfl1, Gfl2 and Gfl3 takes place.

Figure 2D:
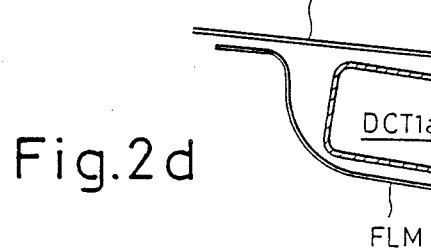
Figure 2B:
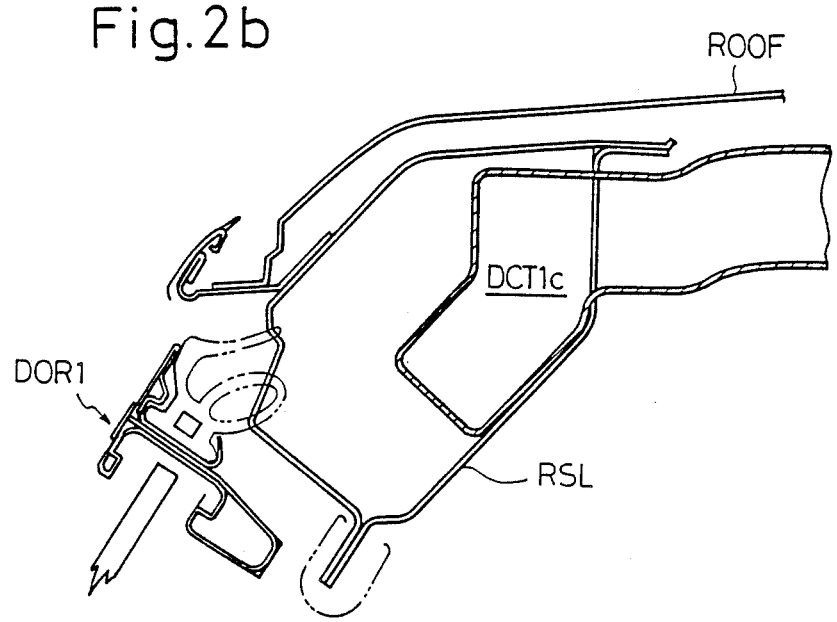
Figure 2C:
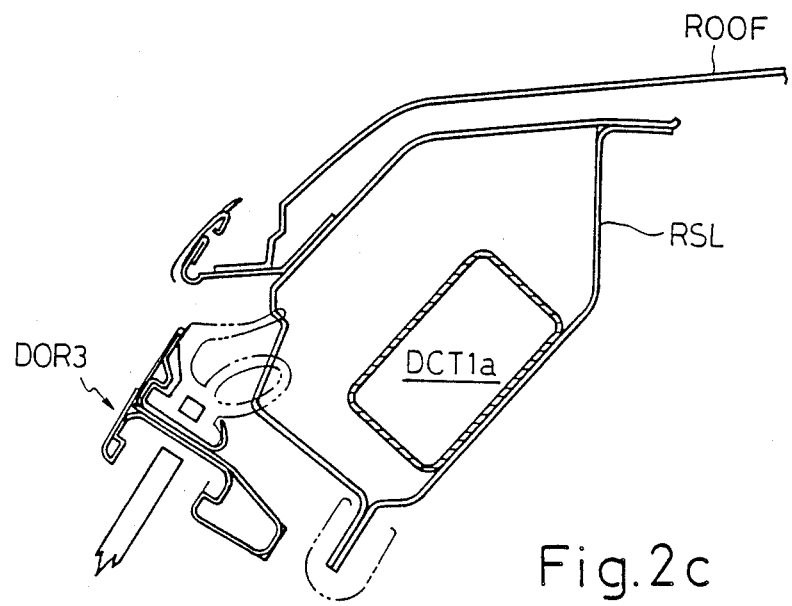

Referring to FIG. 2a, it will be noted that the air ducts DCT1a and DCT1c are disposed along a roof (ROOF). While the air duct DCT1 and the like are shown as exposed, it will be seen from the cross sections taken along lines IIB—IIB, IIC—IIC or IID—IID shown in FIG. 2a, all illustrated in FIGS. 2b, 2c and 2d, respectively, that the main body of the air duct DCT1c extends through a roof side rail RSL (FIG. 2b), that the main body of the air duct DCT1a extends through a roof side rail RSL (FIG. 2c) and a rear window frame FLM (FIG. 2d) and that their branches are covered by a top ceiling lining. Accordingly, in actuality, grilles Gd, Gfr1, Gfr2, Gfr3, Grr1 and Grr2 are exposed to the compartment.

While not shown, air ducts DCT1b and DCT1d as well as grilles Ge, Gfl1, Gfl2, Grl1, Grl2 are disposed in a symmetrical manner with respect to the arrangement of FIG. 2a.

The face mode includes a spot mode and a laminar flow mode. In a standard spot mode, dampers DMPa, DMPb, DMPj, DMPd, DMPm and DMPe are opened while the remaining dampers are closed. (A modification will be described later.) Thus the air ejection through the grilles Ga, Gb, Gd and Ge takes place. In a standard laminar flow mode, dampers DMPa, DMPb, DMPc, DMPj, DMPk, DMPl, DMPm are opened, while dampers DMPd and DMPe are closed. (A modification will be described later.) Thus, the air ejection through the grilles Ga, Gb, Gc, Gfr1, Gfr2, Gfr3, Gfl1, Gfl2, Gfl3, Grr1, Grr2, Grl1, and Grl2 takes place.

In the foot mode, the damper DMP2 is set to its open condition to establish a communication between the air mix chamber MIX and the air duct DCT2. The damper DMP2 is driven by a negative pressure diaphragm DFM2, which operates to close the damper DMP2 in response to the application of a negative pressure thereto and to open the damper DMP2 when the atmospheric pressure is applied thereto. A switching between the negative pressure or the atmospheric pressure applied to the diaphragm DFM2 takes place by a solenoid valve Sol2. Thus, when the solenoid Sol2 is deenergized, the atmospheric pressure is applied to the diaphragm DFM2 while when the solenoid Sol2 is energized, a negative pressure from the intake manifold of the engine is applied to the diaphragm DFM2. Accordingly, the solenoid valve Sol2 is deenergized during the foot mode.

The air duct DCT2 is divided into four branches, the end of each of which opens into an FR foot grille Gf corresponding to the FR seat, an FL foot grille Gg corresponding to the FL seat, an RR foot grille Gh corresponding to the RR seat and an RL foot grille Gi corresponding to the RL seat. Located in the branch end of the air duct DCT2 are dampers DMPf, DMPg, DMPh and DMPi which are in association with the grilles Gf, Gg, Gh and Gi, respectively, thus controlling the air ejection through the respective grilles. Thus, the air ejection through the grille Gf takes place when the damper DMPf is open, and similarly the air ejection through the grille Gg, Gh or Gi takes place when the damper DMPg, DMPh or DMPi is open. The dampers DMPf, DMPg, DMPh and DMPi are driven by motors Mf, Mg, Mh and Mi, respectively.

In the defroster mode, the damper DMP1 is brought to its closed condition, and the damper DMP3 is brought to its open condition, establishing a communication between the air mix chamber MIX and the air duct DCT3. The damper DMP1 is driven by the negative pressure diaphragm DFM1 as mentioned previously, and a damper DMP3 is driven by a negative pressure diaphragm DFM3. The diaphragm DFM1 closes and opens the damper DMP1 when the negative pressure or the atmospheric pressure is applied thereto. The diaphragm DFM3 opens and closes the damper DMP3 when the negative pressure or the atmospheric pressure is applied thereto. A switching between the negative pressure or the atmospheric pressure applied to the diaphragm DFM1 takes place by the solenoid valve Sol1 while a switching between the negative pressure or the atmospheric pressure applied to the diaphragm DFM3 takes place by a solenoid valve Sol3. When the solenoid Sol1 is deenergized, the atmospheric pressure is applied to the diaphragm DFM1, and a negative pressure from the intake manifold of the engine is applied to the diaphragm DFM1 when the solenoid Sol1 is energized. When the solenoid Sol3 is deenergized, the atmospheric pressure is applied to the diaphragm DFM3, and a negative pressure from the intake manifold of the engine is applied to the diaphragm DFM3 when the solenoid Sol3 is energized. Thus, solenoids Sol2 and Sol3 are energized during the foot mode.

The air duct DCT3 communicates with a defroster grille GDEF which opens toward the bottom of the front glass pane.

Figure 3A:
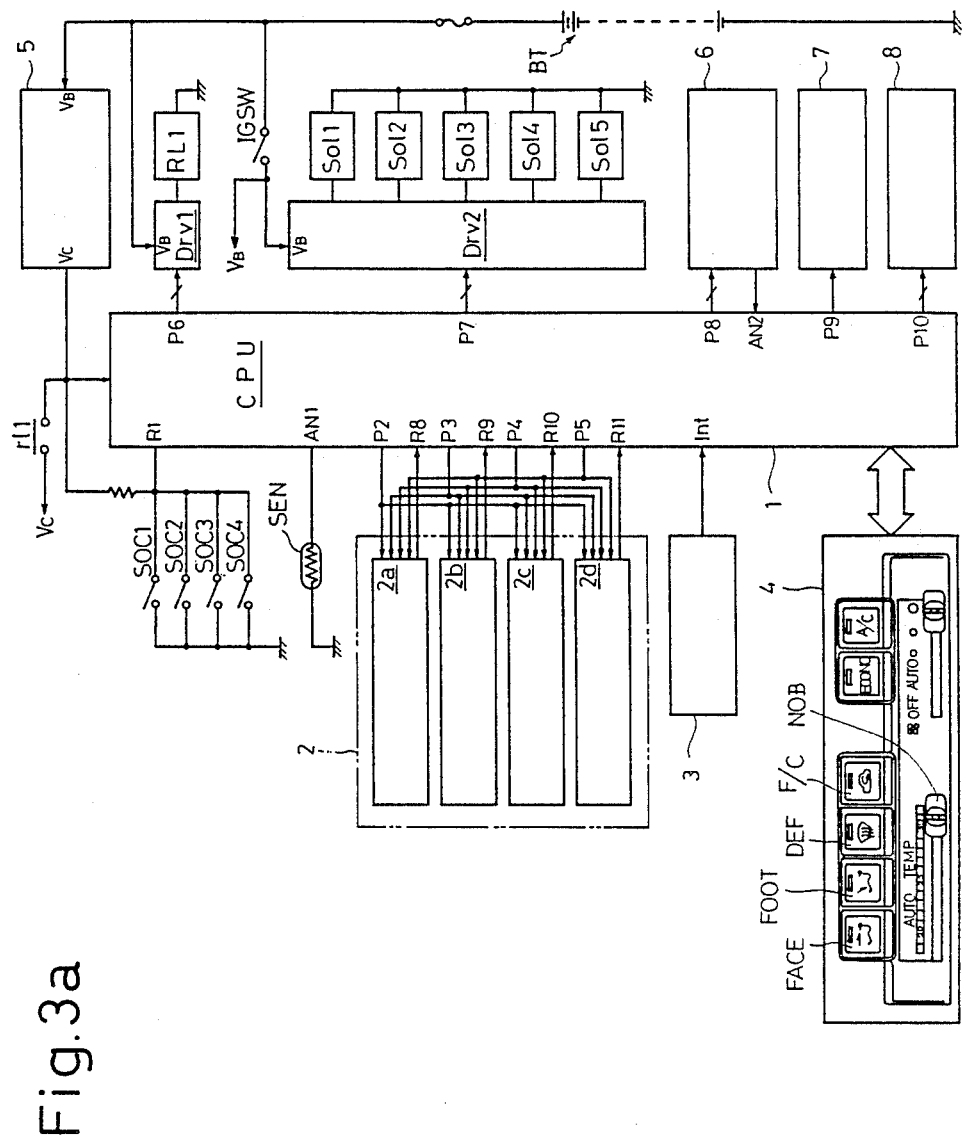
FIGS. 3a and 3b in combination represent a block diagram of an electrical control system used in the embodiment.
Figure 3B:
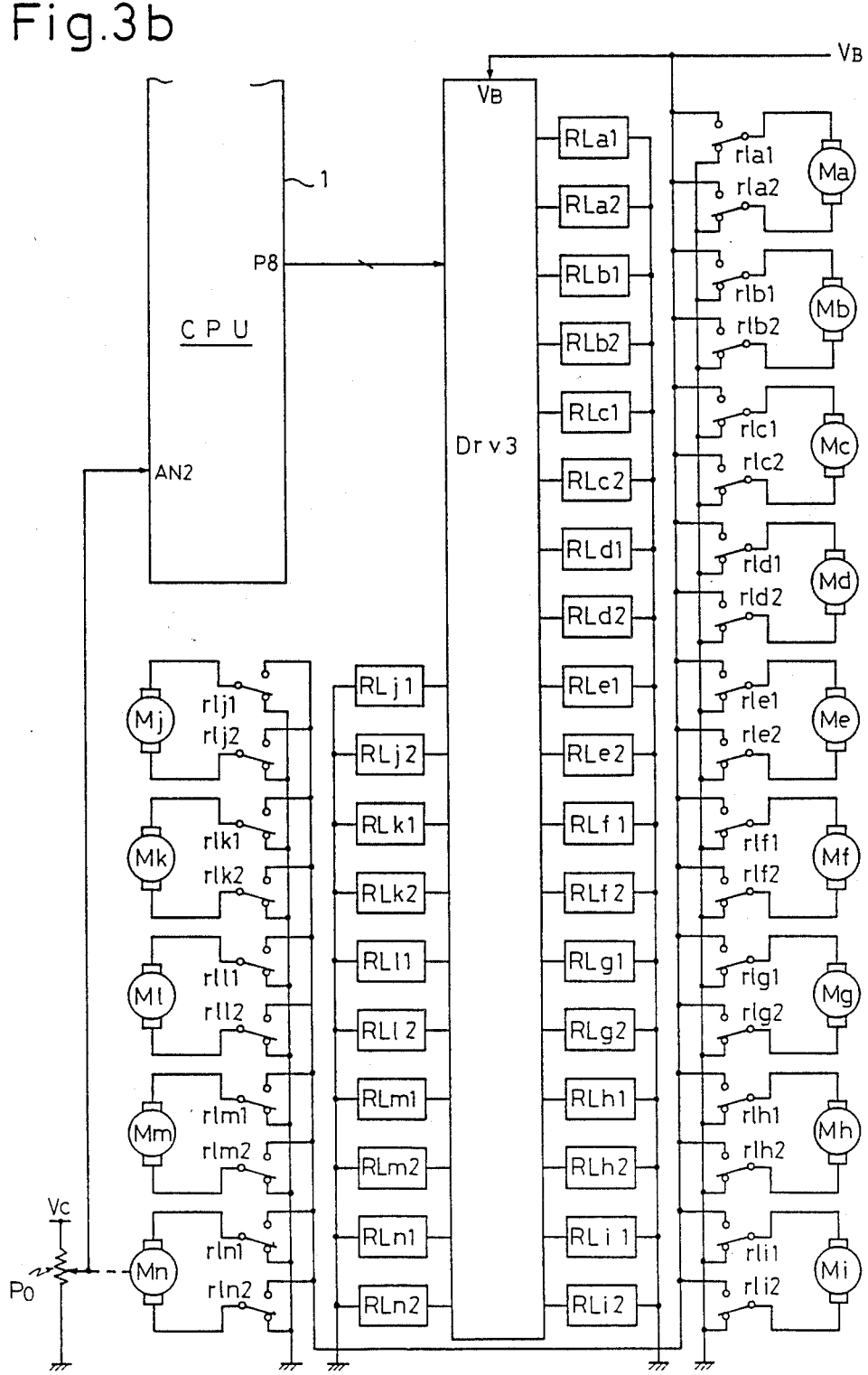

FIGS. 3a and 3b in combination show a block diagram of an electrical control system used in the embodiment. The electrical control system essentially comprises a microcomputer (hereafter referred to as CPU) 1. Connected to CPU 1 are an occupant detector unit 2, 0.1 second timer 3, a decoder 4, an operating board 5, a motor control unit 6, a blower control unit 7, a cooler control unit 8, a relay driver Drv1, a solenoid driver Drv2, door courtesy switches SOC1, SOC2, SOC3, and SOC4, and a temperature sensor SEN.

An onboard battery BT has a negative terminal connected to a car body which represents an electrical ground and a positive terminal which is connected to power input terminals $V_B$ of the power unit 5 and the relay driver Drv1, and connected through an ignition switch IGSW to a power input terminal $V_B$ of the solenoid driver Drv2.

The power unit 5 feeds a constant voltage $+V_c$ to CPU 1, and is also connected through relay contacts rl1 to feed the occupant detector unit 2 and the timer 3.

A relay RL1 is connected to the relay driver Drv1, which is effective to energize or deenergize the relay RL1 in accordance with a command delivered from an output port P6 of CPU1. The relay contacts rl1 make and brake when the relay RL1 is energized and deenergized, respectively.

The solenoid valves Sol1, Sol2, Sol3, Sol4, and Sol5 are connected to the solenoid driver Drv2, which selectively energizes and deenergizes these solenoids in accordance with a command delivered from an output port P7 of CPU 1.

The construction of the motor control unit 6 is shown in detail in FIG. 3b. Specifically, the unit 6 includes a relay driver Drv3, and a plurality of relays connected therewith. The driver Drv3 selectively energizes and deenergizes these relay in accordance with a command delivered from an output port P8 of CPU 1.

Relay contacts rla1 of relay RLa1 and relay contacts rla2 of relay RLa2 are connected in the line which is used to energize the motor Ma. When the relay RLa1 is energized while the relay RLa2 is deenergized, the relay contacts rla1 make with the supply while the relay contacts rla2 make with the ground. Accordingly, the motor Ma is energized for rotation in the forward direction to open the damper DMPa. When the relay RLa1 is deenergized while the relay RLa2 is energized, the relay relay contacts rla1 make with the ground while the relay contacts rla2 make with the supply, whereby the motor Ma is energized for rotation in the reverse direction to close the damper DMPa.

Relay contacts rlb1 of relay RLb1 and relay contacts rlb2 of a relay RLb2 are connected in the line which is used to energize the motor Mb. When the relay RLb1 is energized while the relay RLb2 is deenergized, the motor Mb is energized for rotation in the forward direction to open the damper DMPb. When the relay RLb1 is deenergized while the relay RLb2 is energized, the motor Mb is energized for rotation in the reverse direction to close the damper DMPb.

The relationship between the remaining relays and motors is similar as mentioned above. Specifically, a combination of relays RLc1 and RLc2 establishes the rotation of the motor Mc in either forward or reverse direction. A combination of relays RLd1 and RLd2 establishes the rotation of the motor Md in either forward or reverse direction. A combination of relays RLe1 and RLe2 establishes the rotation of the motor Me in either forward or reverse direction. A combination of relays RLf1 and RLf2 establishes the rotation of the motor Mf in either forward or reverse direction. A combination of relays RLg1 and RLg2 establishes the rotation of the motor Mg in either forward or reverse direction. A combination of relays RLh1 and RLh2 establishes the rotation of the motor Mh in either forward or reverse direction. A combination of relays RLi1 and RLi2 establishes the rotation of the motor Mi in either forward or reverse direction. A combination of relays RLj1 and RLj2 establishes the rotation of the motor Mj in either forward or reverse direction. A combination of relays RLk1 and RLk2 establishes the rotation of the motor Mk in either forward or reverse direction. A combination of relays RLl1 and RLl2 establishes the rotation of the motor Ml in either forward or reverse direction. A combination of relays RLm1 and RLm2 establishes the rotation of the motor Mm in either forward or reverse direction. Finally, a combination of relays RLn1 and RLn2 establishes the rotation of the motor Mn in either forward or reverse direction.

When the motor Mc is energized for rotation in the forward direction, the damper DMPc is opened. When it is energized for rotation in the reverse direction, the damper DMPc is closed. In the similar manner, the motor Md opens and closes the damper DMPd when it is energized for rotation in forward or reverse direction, respectively. The motor Me opens and closes the damper DMPe when it is energized for rotation in forward and reverse direction, respectively. The motor Mf opens and closes the damper DMPf when it is energized for rotation in forward and reverse direction, respectively. The motor Mg opens and closes the damper DMPg when it is energized for rotation in forward and reverse direction, respectively. The motor Mh opens and closes the damper DMPh when it is energized for rotation in forward and reverse direction, respectively. The motor Mi opens and closes the damper DMPi when it is energized for rotation in forward and reverse direction, respectively. The motor Mj opens and closes the damper DMPj when it is energized for rotation in forward and reverse direction, respectively. The motor Mk opens and closes the damper DMPk when it is energized for rotation in forward and reverse direction, respectively. The motor Ml opens and closes the damper DMPl when it is energized for rotation in forward and reverse direction, respectively. The motor Mm opens and closes the damper DMPm when it is energized for rotation in forward and reverse direction, respectively. The motor Mn drives the air mix damper DMPn clockwise when it is energized for rotation in the forward direction, and drives the damper DMPn counter-clockwise when it is energized for rotation in the reverse direction. It will be noted that the potentiometer Po which is mechanically coupled to the motor Mn provides an output which is applied to an analog input port AN2 of CPU 1. The battery voltage is fed through the ignition switch IGSW to the power input terminal $V_B$ of the relay driver Drv3 as well as the respective supply lines of the individual motors.

Returning to FIG. 3a, CPU 1 has an input port R1, to which four door open/closed detection switches SOC1, SOC2, SOC3 and SOC4 are connected in parallel. These switches are mounted on FR door (DOR1 shown in FIG. 2a), FL door, RR door (DOR3 shown in FIG. 2a), and RL door, respectively, which are utilized by an occupant desiring to be seated upon FR, FL, RR or RL seat, respectively, during his boarding. When FR door is opened, the switch SOC1 is turned on. The remaining switches are turned on when their associated doors are opened. Thus, only when all the doors are closed and hence all the switches are off, an H level is applied to the input port R1, and if any door remains open, the corresponding switch remains on and hence an L level is applied to the input port R1.

The temperature sensor SEN is juxtaposed with a room lamp which is disposed centrally on the ceiling of the vehicle. It provides an output which is applied to the analog input port AN1 of CPU 1.

The operating board 4 includes mode selection switches FACE, FOOT, DEF, F/C and a temperature selection knob NOB. Each of the mode selection switches comprises a self-holding pushbutton switch internally housing a solenoid-operated latch mechanism constructed by hard logic, and maintains its on condition once it is depressed. It is to be noted that the switch F/C repeats turn-on/off operation upon each depression, but the remaining switches FACE, FOOT and DEF have their condition established by the hard logic. A transition between various switch conditions is indicated in Table 1 below where 1 represents a condition in which only the switch FACE is on, 2 a condition in which only the switch FOOT is on, 3 a condition in which only the switch DEF is on, 4 a condition in which both switches FACE and FOOT are on, and 5 a condition in which both switches FOOT and DEF are on.

TABLE 1

|  | 1 | 2 | 3 | 4 | 5 |
| --- | --- | --- | --- | --- | --- |
| FACE | 1 | 4 | 1 | 2 | 4 |
| FOOT | 4 | 2 | 5 | 1 | 3 |
| DEF | 3 | 5 | 3 | 5 | 2 |

Specifically, operating the switch FACE when only the switch FACE is on (condition 1) does not cause any change in the condition, thus maintaining the condition 1. Operating the switch FACE when the switch DEF is on (condition 3) results in turning the switch DEF off while turning the switch FACE on (condition 1). When initialized (when the power is turned on), the hard logic establishes condition 1 by turning only the switch FACE on. The knob NOB is coupled to a movable contact on a variable resistor which is internally housed, allowing any desired temperature within a range from 19° C. to 31° C. to be selected at an interval of 1° C.

The timer 3 has an output terminal which is connected to an interrupt port Int of CPU 1.

The 0.1 second timer 3 has an output terminal connected to an interrupt port Int of CPU 1, and generates an interrupt request to CPU 1 every 0.1 second. During an interrupt operation which is initiated by the interrupt request from the timer 3, CPU 1 detects the presence or absence of an occupant on each seat using the occupant detector unit 2 to be described below.

Figure 4:
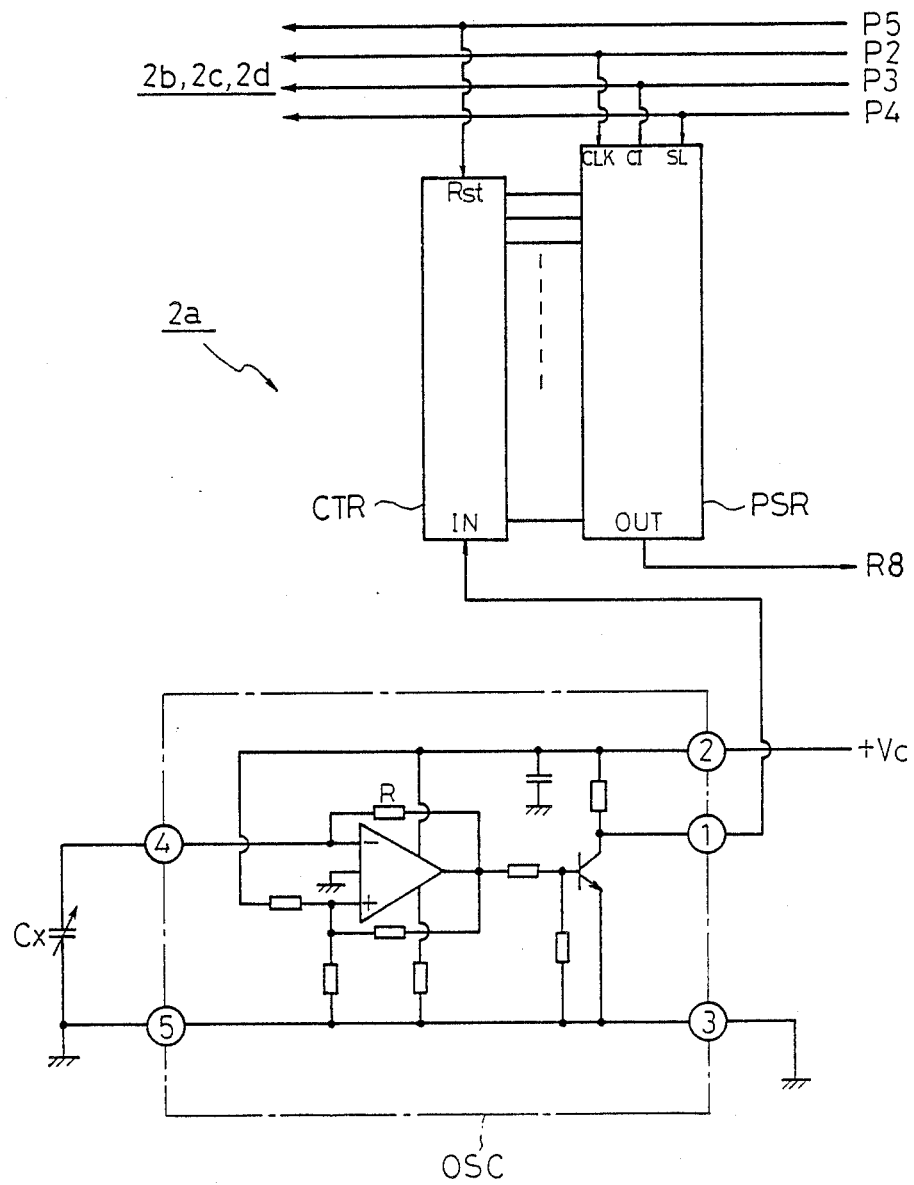

The detector unit 2 includes four sections 2a, 2b, 2c and 2d associated with FR, FL, RR and RL seat, respectively. FIG. 4 shows the section 2a of the occupant detector unit 2. The unit 2 comprises an oscillator OSC, a counter CTR, and a parallel-in and serial-out shift register (hereafter abbreviated as PS register) PSR.

The oscillator OSC comprises an astable multivibrator with an external capacitor Cx connected between terminals 4 and 5. In FIG. 4, resistors are indicated by rectangles. By choosing suitable values for the resistors, there can be obtained an output signal of a frequency which is inversely proportional to the product of the capacitance of the external capacitor Cx and the resistance of resistor R, the frequency decreasing for an increased capacitance and increasing for a decreased capacitance of the external capacitor Cx.

The output signal from the terminal 1 of the oscillator OSC is applied to an input terminal IN of the counter CTR, which counts up in response to the leading end of the output signal. The counter CTR have 16 bit parallel output terminals which are connected to 16 bit parallel input terminals of the PS register PSR. The counter CTR has a reset input terminal Rst, which is connected to an output port P5 of CPU 1.

The register PSR has a clock input terminal CLK connected to an output port P2 of CPU 1, a clock inhibit input terminal CI connected to an output port P3 of CPU 1, and a shift load input terminal SL connected to an output port P4 of CPU 1. The register PSR presets 16 bit data applied to its parallel input terminals into the respective bit positions in response to the leading end of a shift load pulse fed from CPU 1, and serially delivers the preset data from its output terminal OUT to a serial input port R8 of CPU 1 in synchronism with the clock pulse applied to its clock input terminal CLK in response to a change in the clock inhibit signal applied to the clock inhibit input terminal CI from CPU 1 to its low level (L).

Figure 5:
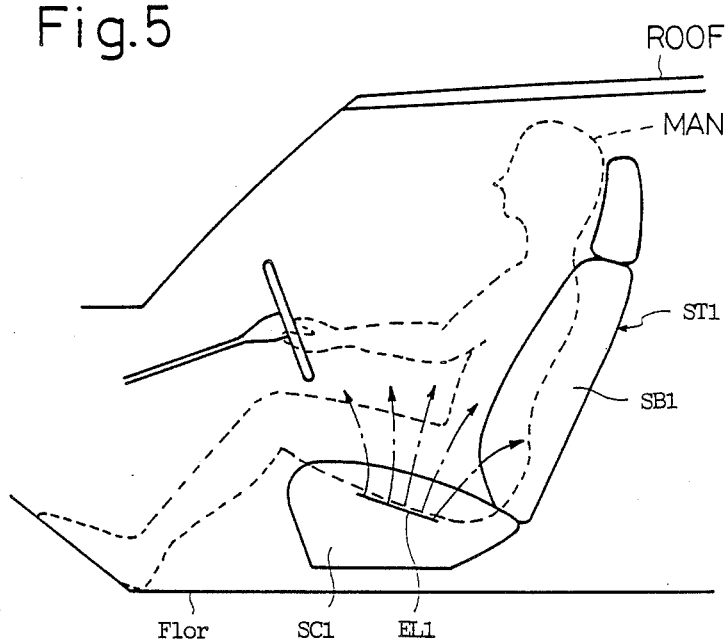
FIG. 5 is a side elevation of a detecting electrode EL1 which is mounted in the front, right-hand seat ST1.

The capacitor Cx shown in FIG. 4 comprises an occupant detecting capacitor defined between a detecting electrode EL1 which is mounted on the seat cushion SC1 of the seat ST1 and the electrical ground defined by the body such as a roof ROOF or a floor Flor, as shown in FIG. 5. Thus, the detecting electrode EL1 is connected to the terminal 4 and the electrical ground is connected to the terminal 5 of the oscillator OSC.

Figure 6A:
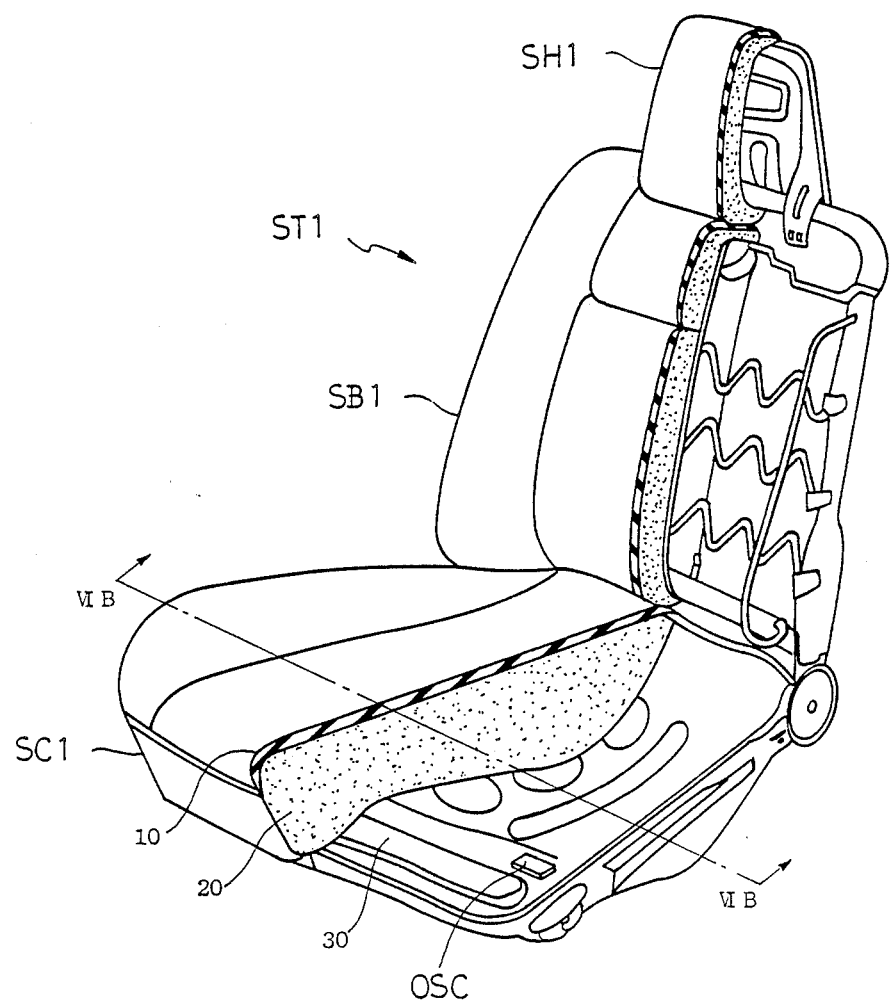
FIG. 6a is a perspective view, partly broken away, of the front, right-hand seat ST1.
Figure 6B:
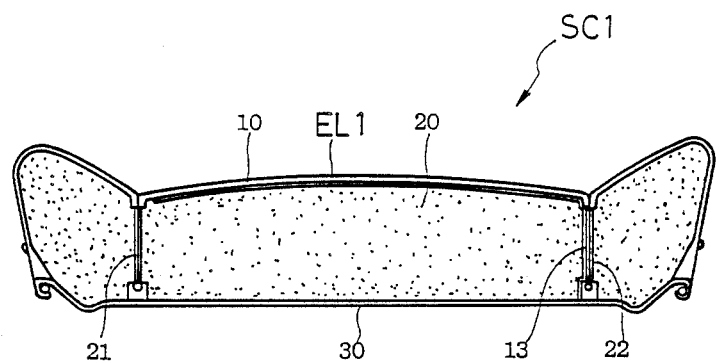

FIG. 6 is a fragmentary cross section, partly broken away, of the seat ST1. The seat ST1 comprises a seat cushion SC1, a seat back SB1 and a head rest SH1. Though the support structure is different, each of these components comprises a fully foamed sheet using a molded urethane pad. FIG. 6b shows a section of the seat cushion SC1 in a region where an occupant MAN is seated taken along the line VIB—VIB in FIG. 6a or in a plane perpendicular to the travelling direction of the vehicle. The seat cushion SC1 comprises a pad support 30 formed of a resin on which a urethane seat cushion pad 20 covered with a trim cover assembly 10 is disposed. Where necessary, the trim cover assembly 10 is fastened to the underside of the seat cushion pad 20 by tension cords extending through holes 21 and 22 formed so as to extend through the seat cushion pad 20, and its opposite ends are fastened to the pad support 30 for retention. The detecting electrode EL1 is assembled into the trim cover assembly 10 and has a lead wire 13 which is passed through the hole 22 to the underside of the seat cushion pad 20 so as to be connected to the terminal 4 of the oscillator OSC (shown in FIG. 6a) which is mounted on the pad support 30.

Figure 6C:
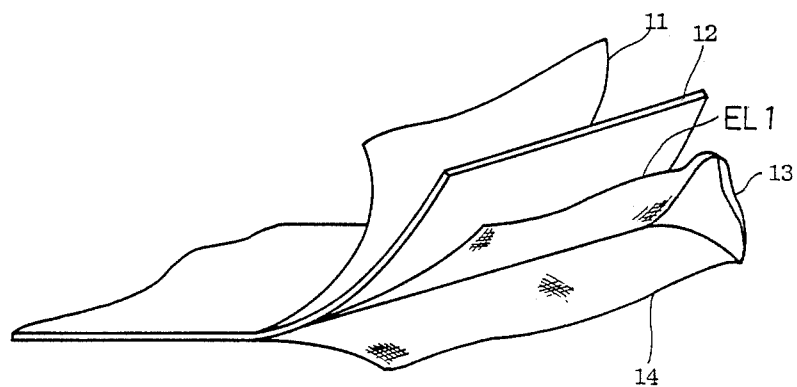
FIG. 6c is a perspective view of a trim cover assembly 10 of the seat cushion SC1 shown in FIGS. 6a and 6b.

FIG. 6c shows the detail of the trim cover assembly 10 in a region where the detecting electrode EL1 is assembled. Specifically, it comprises a skin 11, a wadding 12 which serves producing the thickness effect of the trim cover assembly and formed by a sheet of sponge material, and a wadding cover 14. The detecting electrode EL1 is formed by a conductive woven fabric which is subjected to an electroless nickel plating, and is interposed between the wadding 12 and the wadding cover 14 to be stitched as the trim cover assembly 10 is sewn. The electrode has a size which depends on an area, the detection of which is desired, but in the present embodiment, it is sized as about 30 cm square, with its corner formed into a ribbon to define the lead wire 13. Thus, it will be seen that the detecting electrode EL1 can be assembled into the trim cover assembly 10 without requiring any additional processing step. Because it conforms to other components of the trim cover assembly, the area of the assembly 10 in which the detecting electrode EL1 is assembled can be treated in the same manner as the remainder. In other words, the detecting electrode EL1 has no adverse influence upon the workability, the appearance or seating reaction.

It will be noted that the skin 11, the wadding 12 and the wadding cover 13 which form the trim cover assembly as well as the seat cushion pad 20 and the pad support 30 are all formed by insulators, and thus the detecting electrode EL1 is insulated from the electrical ground to form an occupant detecting capacitor with the electrical ground. Arrows shown in phantom lines in FIG. 5 represents electric lines of force which would be produced when a suitable voltage is applied to the occupant detecting capacitor. Since the occupant MAN seated upon the seat ST1 links with these electric lines of force, such occupant may be considered as a high dielectric member interposed between the electrodes of the occupant detecting capacitor. In other words, the occupant detecting capacitor has a capacitance which varies largely between the presence and the absence of the occupant MAN.

Other sections 2b, 2c and 2d which are not specifically illustrated are all constructed in an identical manner as the section 2a mentioned above, and the oscillator of the respective sections is connected with a detecting electrode which is assembled into FL seat, RR seat or RL seat, respectively. As shown in FIG. 3, the output terminal of PS register of the respective sections is connected to a serial input port R9, R10, or R11 of CPU 1.

Figure 7:
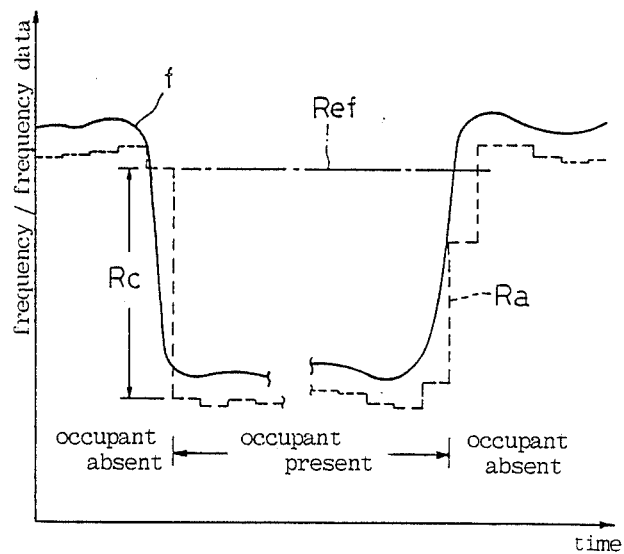

Referring to FIG. 7, the detection of the presence of an occupant with the apparatus of the embodiment will be described briefly. FIG. 7 graphically shows an example of a change in the oscillation frequency f of the oscillator OSC with time by a solid line curve, frequency data Ra which is sampled by CPU 1 by a broken line curve and reference data Ref established by CPU 1 by a phantom line curve, respectively.

CPU 1 samples the number of pulses which are output from the oscillator during the interrupt period of 0.1 second timer 3 or during a time interval of 0.1 second, and which corresponds to the oscillation frequency f of the oscillator, thereby monitoring a change in the oscillation frequency f. Specifically, frequency data Ra obtained during a current sampling is compared against old frequency data which is obtained during the immediately preceding sampling to derive change data Rc. While the oscillation frequency f of the oscillator OSC is continually changing though slightly, there occurs a rapid reduction in a frequency to cause the change data Rc to exceed a given value when the occupant MAN is seated upon the seat ST1. Upon detection of this change, the presence of an occupant is determined, and the frequency data which was obtained before the occurrence of the reduction or obtained during the previous sampling is chosen as a reference data Ref. Subsequently, the frequency data Ra is examined, and the absence of an occupant is determined if it exceeds reference data Ref.

Depending on the condition of the switches on the operating board 4, CPU 1 establishes either an ejection mode (a face mode, foot mode and/or defroster mode) as well as a suction mode (fresh mode or circulation mode), and controls the opening or closing of various dampers shown in FIG. 1 (DMP1, DMP2, DMP3, DMP4, DMPa, DMPb, DMPc, DMPd, DMPe, DMPf, DMPg, DMPh, DMPi, DMPj, DMPk, DMPl, DMPm) depending on the mode selected and the presence or absence of an occupant or occupants on FR, FL, RR and RL seats. This control is summarized briefly below.

(1) In the face mode, the damper DMP1 is initially opened, and if a difference between the temperature within the compartment and the preset temperature exceeds a given value, the spot mode is established. If the difference is equal to or less than the given value, the laminar flow mode is established.

In the spot mode, the dampers DMPc, DMPk and DMPl are closed. If an occupant is seated upon FR seat, the damper DMPa is opened, but is closed otherwise. If an occupant is seated upon FL seat, the damper DMPb is opened, but is closed otherwise. If an occupant is seated upon RR seat, the dampers DMPj and DMPd are opened, but the damper DMPj is closed otherwise. If an occupant is seated upon RL seat, the dampers DMPm and DMPe are opened, but the damper DMPm is closed otherwise. Thus, during the spot mode, only those of the face grilles Ga, Gb, Gd and Ge which correspond to seats on which an occupant or occupants are seated are selected for air ejection.

In the laminar flow mode, if an occupant is seated upon FR seat, the dampers DMPa, DMPc and DMPk are opened, but are closed otherwise. If an occupant is seated upon FL seat, the dampers DMPb, DMPc and DMPl are opened, but are closed otherwise. If an occupant is seated upon RR seat, the damper DMPj is opened while the damper DMPd is closed. If no occupant is seated, the damper DMPj is closed. If an occupant is seated upon RL seat, the damper DMPm is opened while the damper DMPe is closed. If no occupant is seated, the damper DMPm is closed. Thus, during the laminar flow mode, when an occupant is seated upon FR seat, the face grilles Ga, Gc and head grilles Gfr1, Gfr2 and Gfr3 are selected for air ejection. When an occupant is seated on FL seat, the face grilles Gb, Gc and head grilles Gfl1, Gfl2 and Gfl3 are selected for air ejection. When an occupant is seated upon RR seat, the head grilles Grr1 and Grr2 are selected for air ejection. Finally, when an occupant is seated upon RL seat, the head grilles Grl1 and Grl2 are selected for air ejection.

(2) In the foot mode, the damper DMP2 is opened. If an occupant is seated on FR seat, the damper DMPf is opened, but is closed otherwise. If an occupant is seated on FL seat, the damper DMPg is opened, but is closed otherwise. If an occupant is seated upon RR seat, the damper DMPh is opened, but is closed otherwise. If an occupant is seated on RL seat, the damper DMPi is opened, but is closed otherwise. Thus, during the foot mode, those of the foot grilles Gf, Gg, Gh and Gi which corresponds to the seats on which an occupant or occupants are seated are selected for air ejection.

(3) In the defroster mode, the damper DMP1 is closed while the damper DMP3 is opened. Thus, an air ejection takes place through the defroster grille GDEF.

(4) In the fresh mode, the damper DMP4 is made open to the atmosphere (as shown in FIG. 1). Thus, the external atmosphere is drawn by the blower Blw.

(5) In the circulation mode, the damper DMP4 is brought to interrupt the communication with the external atmosphere, or is moved counter-clockwise from the position shown in FIG. 1. Accordingly, the air within the compartment is drawn by the blower Blw.

Figure 8:
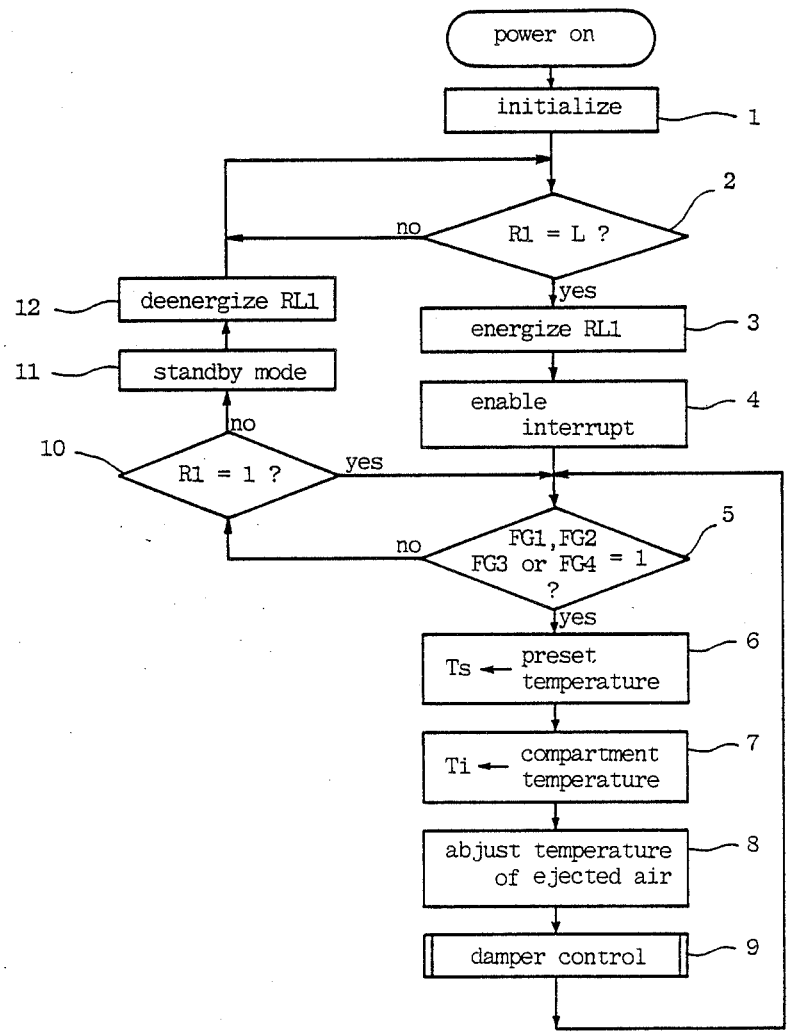

Specific operation of CPU 1 will now be described with reference to the flowcharts shown in FIGS. 8, 9a to 9e and 10. FIG. 8 shows a flowchart of a main routine. When the onboard battery BT feeds the various parts of the arrangement, CPU 1 performs an initilization by resetting internal registers, flags, input/output ports and other components at S1 (representing a step number, it being understood that the step number is entered on the respective Figures). At S2, it enters a standby mode until the input port R1 assumes an L level as a result of opening of FR, FL, RR and/or RL door. During the standby mode, the relay driver Drv1 commands the deenergization of the relay RL1, thus minimizing the power dissipation.

When either one or more of FR, FL, RR and/or RL door is opened during a boarding process, the switches SOC1, SOC2, SOC3 and/or SOC4 is or are turned on, whereby the input port R1 assumes the L level. Accordingly, CPU 1 commands the relay driver Drv1 to energize the relay RL1 at S3. This allows the constant voltage Vc to be fed to the occupant detector unit 2 and the timer 3, whereby a timer interrupt operation is enabled at S4.

Figure 10:
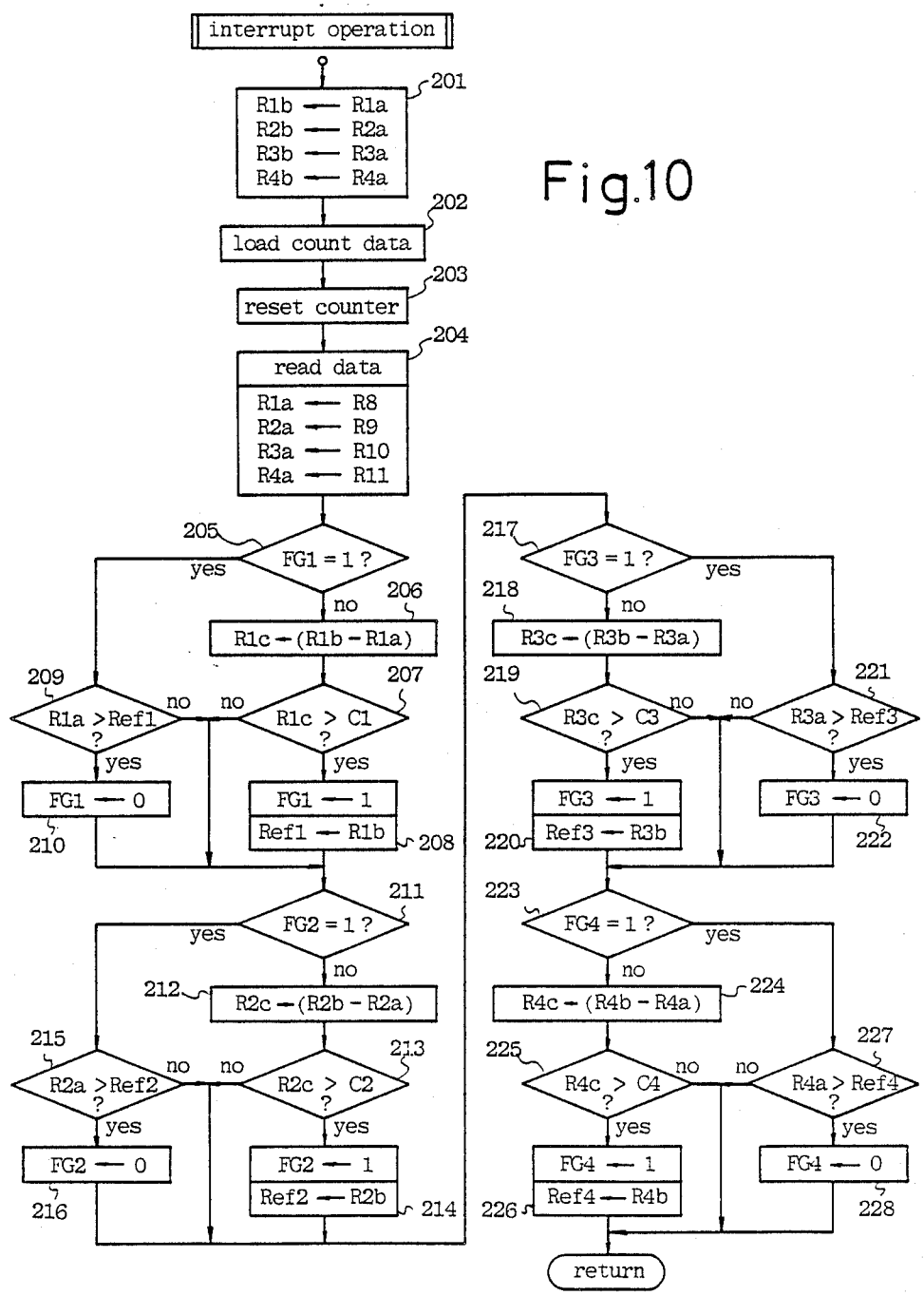

Every time an interrupt request is generated by the timer 3, an interrupt processing operation shown in FIG. 10 is executed to detect the presence or absence of an occupant on each seat. The detection of presence of an occupant is not performed during the standby mode since there can be no occupant before either door is opened. The interrupt processing operation will be described first with reference to the flowchart of FIG. 10.

In the interrupt processing operation, data in a register R1a, R2a, R3a or R4a is stored in register R1b, R2b, R3b or R4b, respectively, at step 201. As will be apparent from the following description, this data represents the frequency data obtained during the immediately preceding interrupt operation or 0.1 second before. At step 202, a shift load pulse (SL pulse) is delivered to the shift load input terminal of PS register PSR, and count data in the counter CTR is preset therein. At step 203, a reset pulse is applied to the reset input terminal Rst of the counter CTR, thereby resetting it. In this manner, the counter CTR counts the number of pulses developed by the oscillator OSC during the interrupt period of the timer 3.

At step 204, the clock inhibit signal which is applied to the clock inhibit input terminal CI is changed to its low level (L), whereby preset data in the register PSR which is serially delivered from its output terminal OUT in synchronism with the clock pulse is read. In this manner, the input to the serial input port R8, R9, R10 or R11 is read and is stored in the register R1a, R2a, R3a or R4a as frequency data.

An occupant detecting routine comprises steps 205 to 210 for FR seat, steps 211 to 216 for FL seat, steps 217 to 222 for RR seat and steps 223 to 228 for RL seat. The routines are identical, and therefore, only the routine for FR seat will be described.

A flag FG1 indicates the presence or absence of an occupant on the seat ST1. It is initially assumed that the flag is reset to 0, indicating the absence of an occupant. At step 206, the content of register R1a is subtracted from the content of the register R1b to provide a change data, which is written into register R1c. At step 207, the content of the register R1c (change data) is compared against a threshold value C1 which is determined experimentarily. When no occupant is seated upon the seat ST1, the change data will have a small value and does not exceed the threshold C1. Accordingly the program directly jump to step 211. However, when an occupant is seated, there occurs a rapid reduction in the oscillation frequency of the oscillator OSC as mentioned previously, whereby the change data exceeds the threshold C1. In this instance, the flag FG1 is set to "1" at step 208, and the content of the register R1b or the old frequency data is written into the register Ref1 as reference data.

When the flag FG is set, the content of the register Ref1 or the reference data is compared against the content of the register R1a or fresh frequency data at step 209 during the subsequent interrupt processing operation. As mentioned, when an occupant is seated upon the seat ST1, any change in the oscillation frequency of the oscillator OSC is small, and hence the fresh frequency data stored in the register R1a cannot exceed reference data stored in the register Ref1. However, when the occupant who has been sitting on the seat ST1 gets out of the vehicle, there occurs a rapid increase in the oscillation frequency, whereby the fresh frequency data stored in the register R1a exceeds the reference data stored in the register Ref1. At this time, the flag FG1 is reset to "0" at step 210.

Similarly, in other occupant detecting routines for the remaining seats, flags FG2, FG3 and FG are set or reset in response to the detection of presence or absence of an occupant.

In this manner, during the interrupt processing operation, the presence or absence of an occupant is detected in terms of a change in the capacitance between the detecting electrode EL1 and the electrical ground, thus avoiding the likelihood of an erroneous detection due to the influences of the temperature, humidity or aging effect. It is to be understood that when a baggage or the like is placed upon the seat, a corresponding change in the capacitance differs largely from that which occurs when an occupant is seated, thus avoiding an erroneous detection which might be caused by a conventional seating switch (which is assembled into the seat cushion and is turned on when a weight is applied thereon).

The operation then returns to FIG. 8. It is to be understood that the subsequent operation presumes that the ignition switch IGSW is turned on. (The control will be of no significance if the switch IGSW is off since then the arrangement of the embodiment is inoperative.) When an occupant or occupants get on the vehicle and become seated upon FR, FL, RR and/or RL seats, flags FG1, FG2, FG3 and/or FG4 are set to "1" during the timer interrupt operation, and accordingly a selected temperature determined by the position of the knob NOB on the operating board 4 is stored in the register Ts at S7, and the temperature of the compartment detected by the temperature sensor SEN (an input to the analog input port AN1) is stored in a register Ti at S7.

At S8, the temperature of the ejected air or the air temperature within the air mix chamber MIX is adjusted, by providing commands to the blower control unit 7, the cooler unit 8, the solenoid driver Drv2 and the relay driver Drv3, based on the content of the register Ts (preset temperature) and the content of the register Ti (the temperature of the compartment) as well as data read from a table stored in an internal ROM, thus regulating the operating level of the blower Blw, the on/off condition of the compressor, the on/off condition of the water valve WV (energization/deenergization of solenoid Sol5) and the opening of the air mix damper DMPn (energization/deenergization of the motor Mn in either forward or reverse direction).

Subsequently, a damper control routine is executed at S9 whereupon the program returns to S5. The damper control routine will now be described in detail with reference to FIGS. 9a to 9e. Initially referring to the flowchart shown in FIG. 9a, CPU 1 stores a difference (absolute value) between the contents of the registers Ts and Ti or a difference between the preset temperature and the temperature of the compartment in register ΔT at S20, and then examines the switch FACE on the operating board 4 at S21. If the switch FACE is on at this time, the program proceeds to S24 and subsequent steps, establishing the face mode.

As mentioned previously, in the face mode, the damper DMP1 is opened to establish a communication between the air mix chamber MIX and the air duct DCT1 (the condition shown in FIG. 1). Specifically, a command is applied to the solenoid driver Drv2 to deenergize the solenoid valve Sol1 at S25. At this time, the flag F1 which indicates the condition of the damper DMP1 is reset to "0", and hence the program then proceeds from S24 to S26, skipping S25, until the damper DMP1 is closed again. Subsequently, the air ejection for each occupant who is seated upon the respective seat is enabled.

It will be noted that the program proceeds to S27 and subsequent steps if an occupant is seated upon FR seat since the flag FG1 has been set to "1" during the timer interrupt operation.

It will be seen from the ensuing description that CPU 1 sets the flag Fa to "1" when the damper DMPa is fully open, and resets this flag to "1" when the damper is fully closed. Accordingly, the flag Fa is examined at S27, and if it is reset, the damper DMPa is brought to its fully open position at S28 to S30. Specifically, at S28, the flag Fa is set to "1", and the relay driver Drv3 is commanded to energize the relay RLa1 and to deenergize the relay RLa2, thus energizing the motor Ma for rotation in the forward direction, followed by S29 during which a full opening of the damper DMPa is waited for. Subsequently, the relay driver Drv3 is commanded to deenergize the relay RLa1 and to deenergize the motor Ma at S30.

At S31, the content of the register ΔT which has been loaded at S20 is examined. If the content is equal to or less than a given value Tth, the flag Fk is examined at S32. When this flag is reset, this means that the damper DMPk is fully closed. Accordingly, the damper DMPk is brought to its fully open condition by energizing the motor Mk for rotation in the forward direction for a given time interval at S33 to S35, generally in the similar manner as mentioned previously. The flag Fk is then set to "1".

If the content of the register ΔT exceeds the given value Tth, the flag Fk is examined at S40. If this flag is set, this means that the damper DMPk is fully open, and accordingly, the damper DMPk is brought to its fully closed position by energizing the motor Mk for rotation in the reverse direction for a given time interval at S41 to S43. The flag Fk is then reset to "0".

When no occupant is seated on FR seat, the flag FG1 has been reset to "0" during the time interrupt operation. Accordingly, the damper DMPa is brought to its fully closed position by energizing the motor Ma for rotation in the reverse direction for a given time interval at S37 to S39, and the damper DMPk is brought to its fully closed position by energizing the motor Mk for rotation in the reverse direction for a given time interval at S41 to S43. However, if the flag Fa has been reset, the processing operation of S37 to S39 is skipped. Similarly, if the flag Fk has been reset, the processing operation of S41 to S43 is skipped.

Figure 9A:
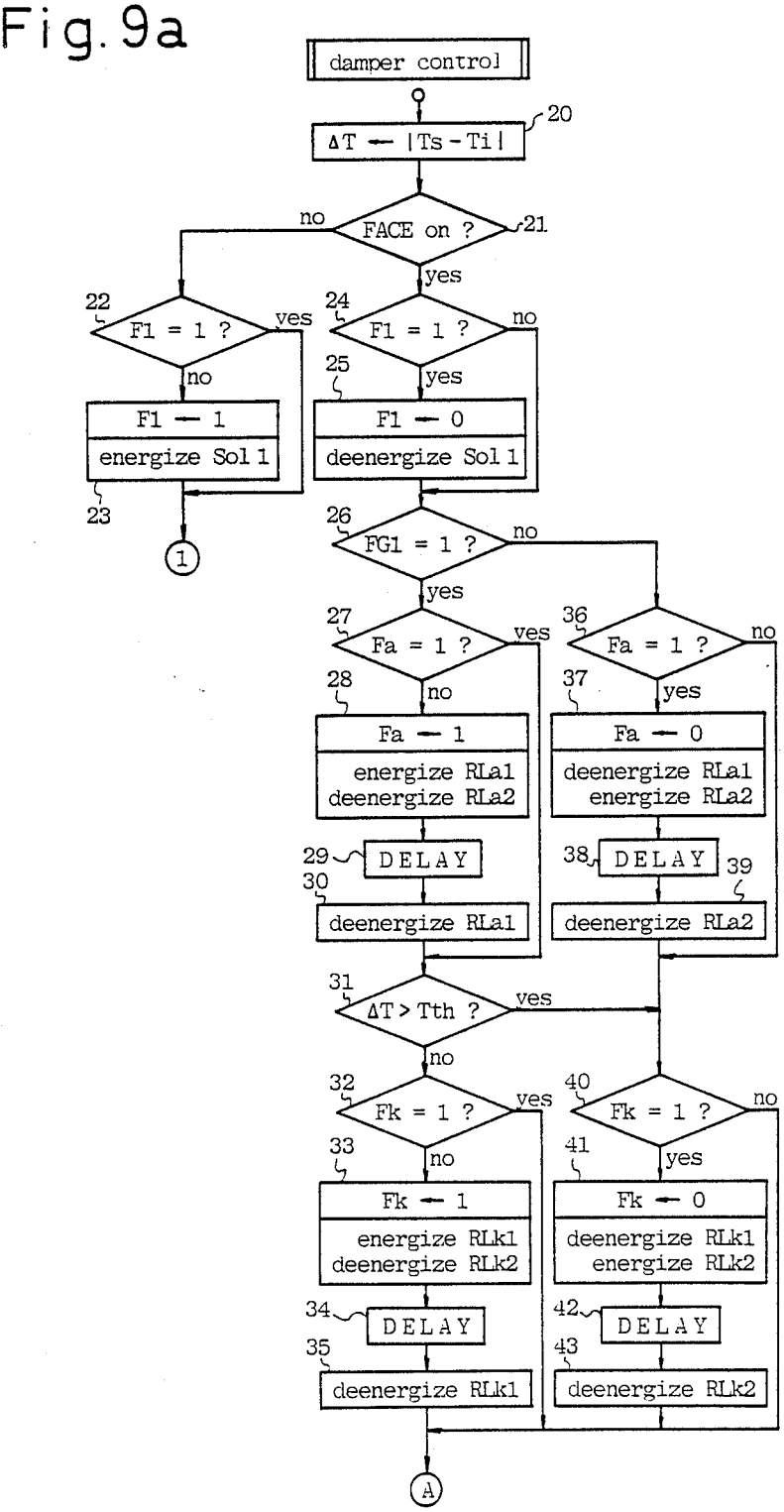
Figure 9B:
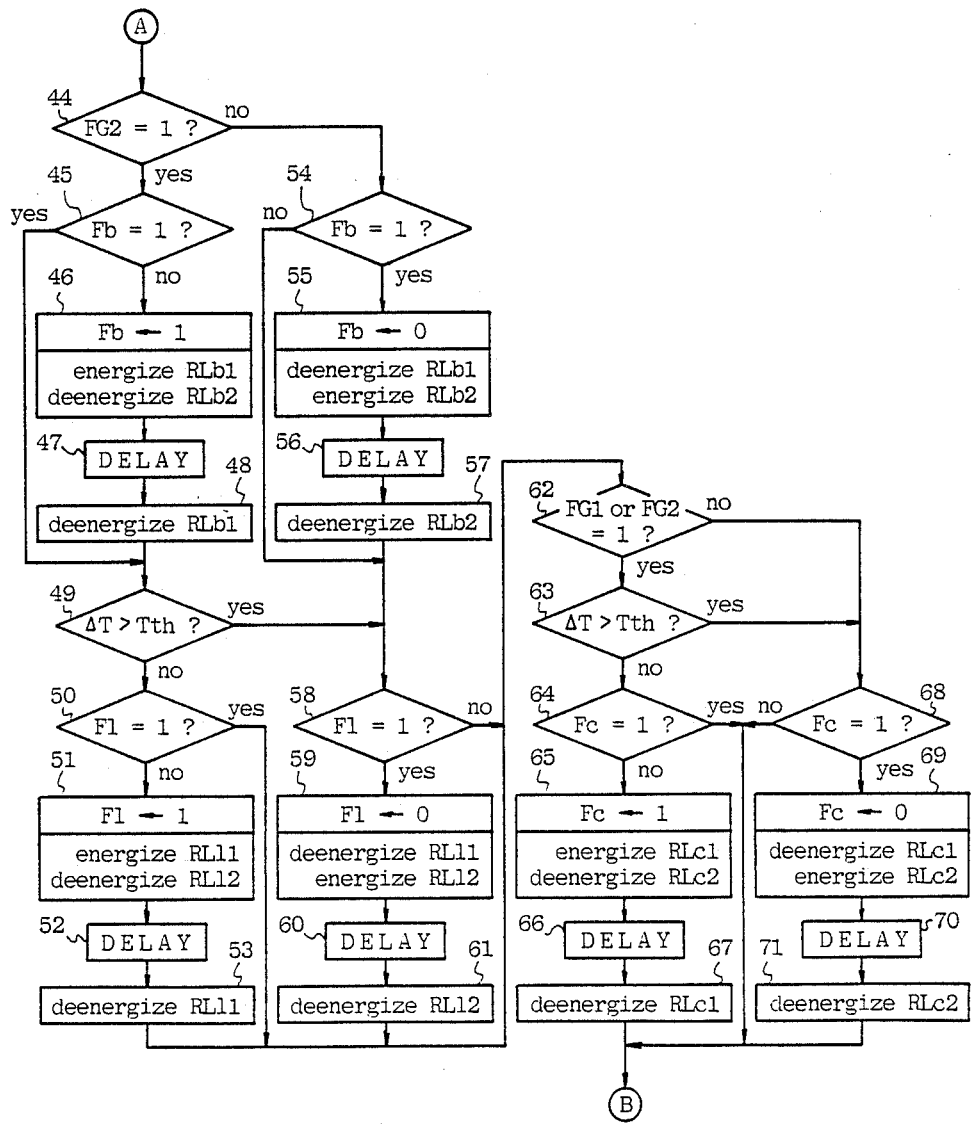

In the flowchart shown in FIG. 9b, the opening or closing of the dampers DMPb and DMPl are established in accordance with the content of the register ΔT and the presence or absence of an occupant on FL seat at S44 to S61. Since the operation which takes place at these steps is similar to that occurring at S26 to S27 mentioned above, it will not be described in detail.

When an occupant is seated on at least one of FR and FL seats or when either flag FG1 or FG2 is set to "1", and when the content of the register ΔT is equal to or less than the given value Tth, the damper DMPc is brought to its fully open position by energizing the motor Mc for rotation in the forward direction for a given time interval at S65 to S67. However, such operation is skipped over if the flag Fc has been set to "1" since then the damper DMPc is fully open.

When an occupant is seated on neither FR or FL seat or when both flags FG1 and FG2 have been reset to "0", or when the difference between the temperature of the compartment and the preset temperature exceeds the given value Tth, the damper DMPc is brought to its fully closed position by energizing the motor Mc for rotation in the reverse direction for a given time interval at S69 to S71. However, such operation is skipped over if the flag Fc has been reset, since then the damper DMPc is fully closed.

Figure 9C:
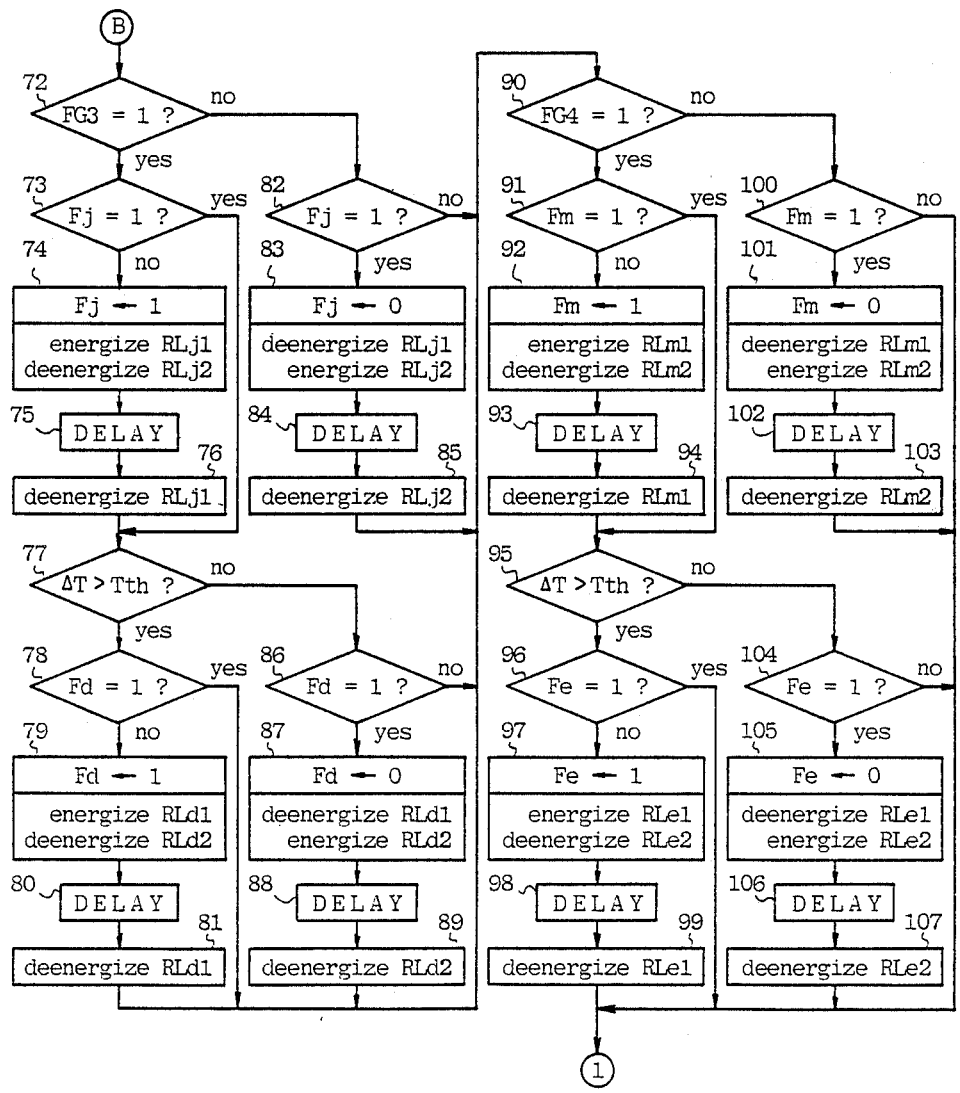
Figure 9D:
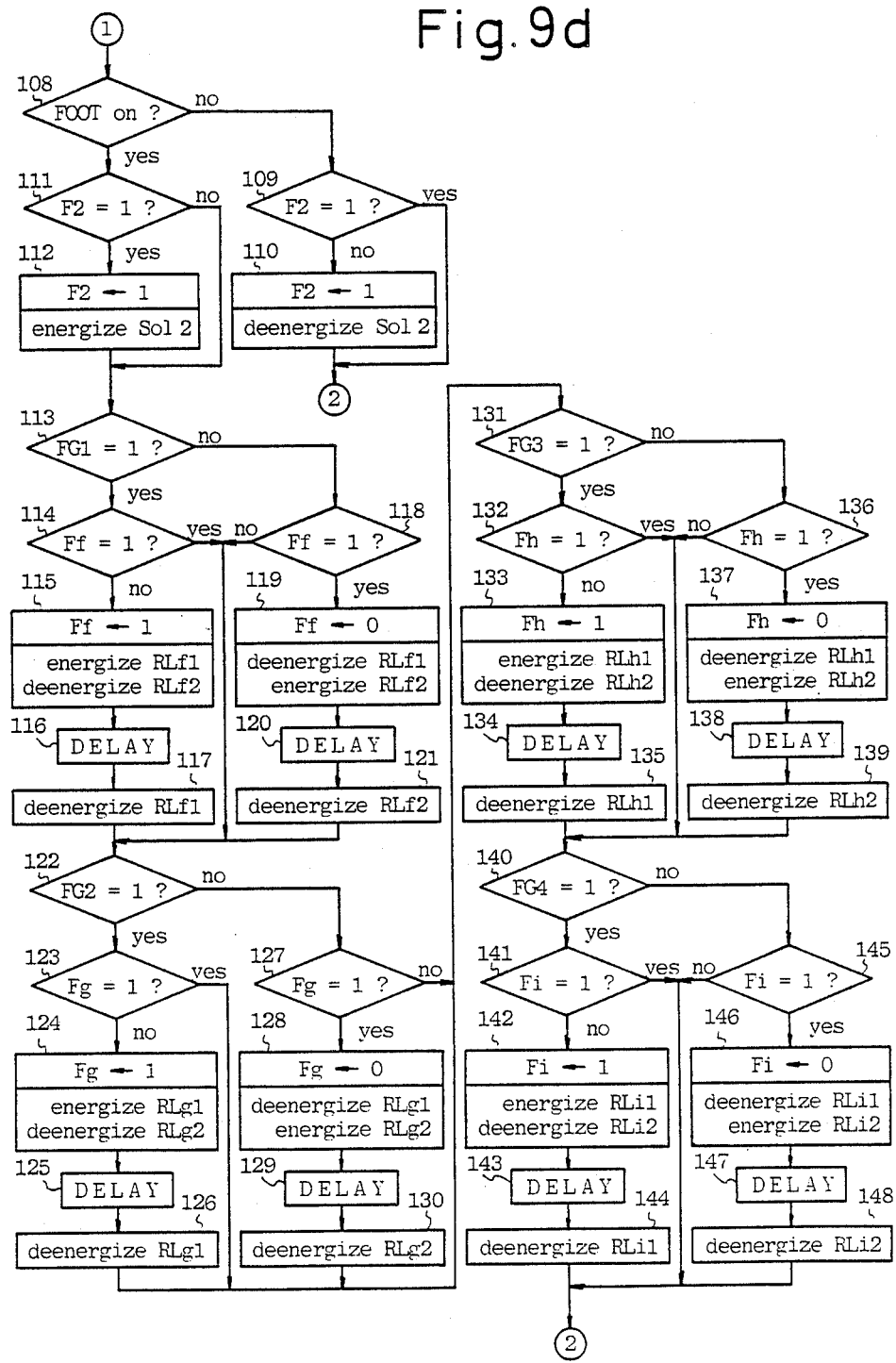
Figure 9E:
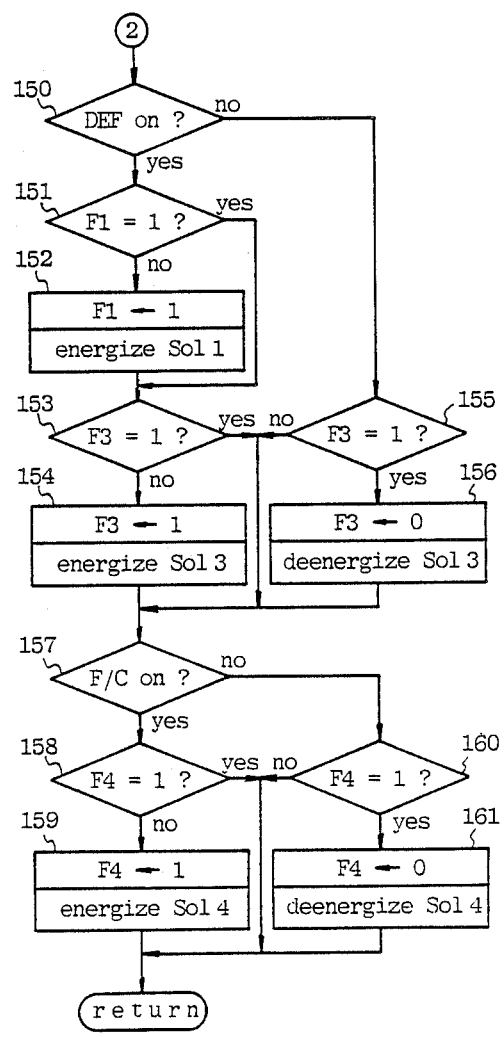

Referring to FIG. 9c, the flag FG3 is examined at S72. If this flag is set to "1", this means that an occupant is seated on RR seat. Accordingly, the damper DMPj is brought to its fully open position by energizing the motor Mj for rotation in the forward direction for a given timer interval at S74 to S76. However, such operation is skipped over if the flag Fj has been set since then the damper DMPj is fully open.

Subsequently, the content of the register ΔT is examined at S77. If the content exceeds the given value Tth, the damper DMPd is brought to its fully open position by energizing the motor Md for rotation in the forward direction for a given time interval at S79 to S81. This operation is skipped over if the flag Fd has been set since then the damper DMPd is already fully open.

If the content of the register ΔT is equal to or less than the given value Tth, the damper DMPd is brought to its fully closed position by energizing the motor Md for rotation in the reverse direction for a given time interval at S87 to S89. Again, this operation is skipped over if the flag Fd has been reset to "0" since then the damper DMPd is already fully closed.

When the flag FG3 is reset, no occupant is present on RR seat, and accordingly the damper DMPj is brought to its fully closed position by the energization of the motor Mj for rotation in the reverse direction for a given time interval at S83 to S85. Again, this operation is skipped over if the flag Fj has been reset, since then this damper is already fully closed.

At S99 to S107, the opening or closing of the dampers DMPm and DMPe are established in accordance with the content of the register ΔT as well as the presence of absence of an occupant on RL seat. Such operation takes place in a similar manner as the operation occurring at S72 to S89 mentioned above, and hence will not be described in detail.

As mentioned, in the face mode, for a difference between the temperature of the compartment and the preset temperature which is equal to or less than the given value Tth, the operation of S27 to S30, S32 to S35 and S64 to S67 is executed to open the dampers DMPa, DMPc and DMPk when an occupant is seated on FR seat; the operation of S45 to S48, S50 to S53 and S64 to S67 is executed to open the dampers DMPb, DMPc and DMPl if an occupant is seated on FL seat; the operation of S73 to S76 and S86 to S89 is executed to open the damper DMPj and to close the damper DMPd if an occupant is seated on RR seat; and the operation of S91 to S94 and S104 to S107 is exeucted to open the damper DMPm and to close the damper DMPe if an occupant is seated on RL seat. When the difference between the temperature of the compartment and the preset temperature exceeds the given value Tth, the operation of S27 to S30, S40 to S43, S58 to S61 (the operation of these steps is executed independently from a seating on the FL seat) and S68 to S71 to open the damper DMPa and to close the dampers DMPc, DMPk and DMPl if an occupant is seated on FR seat; the operation of S40 to S43 (these steps are executed independently from a seating on the FR seat), S45 to S48, S58 to S61 and S68 to S71 to open the damper DMPb and to close the dampers DMPc, DMPk and DMPl if an occupant is seated on FL seat; the operation of S73 to S76 and S78 to S81 is executed to open the dampers DMPj and DMPd if an occupant is seated on RR seat; and the operation of S91 to S94 and S96 to S99 is executed to open the dampers DMPm and DMPe if an occupant is seated on RL seat, establishing the spot mode in each instance. It will thus be seen that when there is a large difference between the temperature of the compartment and the preset temperature, the air ejection is concentrated around the seated occupant to bring the temperature around him rapidly close to the preset temperature, and the air ejection is caused to take place in a diffused manner to provide a more gentle temperature control as the temperature of the compartment approaches the preset temperature.

Returning to FIG. 9a, if the switch FACE is found to be off at S21, the program then proceeds to S22 and S23, thus terminating the face mode. Specifically, a command is applied to the solenoid driver Drv2 to energize the solenoid Sol1 to close the damper DMP1, thus interrupting a communication between the air mix chamber MIX and the air duct DCT1 at S23. The flag F1 which indicates the condition of the damper DMP1 is then set to "1", preventing a subsequent repeated control. Subsequently, the program proceeds to S108 shown in the flowchart of FIG. 9d, where the switch FOOT on the operating board 4 is examined. If this switch is on, the program proceeds to S111 and subsequent steps, thus establishing the foot mode.

As mentioned previously, in the foot mode, the damper DMP2 is opened to establish a communication between the air mix chamber MIX and the air duct DCT2 (as shown in FIG. 1). Specifically, at S112, a command is applied to the solenoid driver Drv2 to deenergize the solenoid Sol2. The flag F2 which indicates the condition of the damper DMP2 is then reset to "0", and hence, the program subsequently proceeds from S111 to S113 to thereby skip S112 until the damper DMP2 is closed again.

The flag FG1 is examined at S112. If this flag is set, this means that an occupant is seated on FR seat. Accordingly, at S114 to S117, the motor Mf is energized to rotate in the forward direction for a given time interval to bring the damper DMPf to its fully open position. However, if the flag is reset, there is no occupant on FR seat, and accordingly, the motor Mf is energized for rotation in the reverse direction for a given time interval to bring the damper DMPf to its fully closed position at S118 to S121.

Similarly, when an occupant is seated on FL seat, the damper DMPg is brought to its fully open position by the energization of the motor Mg for rotation in the forward direction for a given time interval at S123 to S126. If no occupant is on FL seat, the damper DMPg is brought to its fully closed position by the energization of the motor Mg for rotation in the reverse direction for a given time interval at S127 to S130. When an occupant is seated on RR seat, the damper DMPh is brought to its fully open position by the energization of the Mh for rotation in the forward direction for a given time interval at S132 to S135. If no occupant is on RR seat, the damper DMPh is brought to its fully closed position by the energization of the motor Mh for rotation in the reverse direction for a given time interval at S136 to S139. When an occupant is seated on RL seat, the damper DMPi is brought to its fully open position by the energization of the Mi for rotation in the forward direction for a given time interval at S141 to S144. If no occupant is on RL seat, the damper DMPi is brought to its fully closed position by the energization of the motor Mi for rotation in the reverse direction for a given time interval at S145 to S148.

It will be noted that at S113 to S148, use is made of a flag Ff indicating the condition of the damper DMPf, a flag Fg indicating the condition of the damper DMPg, a flag Fh indicating the condition of the damper DMPh, and a flag Fi indicating the condition of the damper DMPi in order to prevent the same operation from being repeated.

When it is found at S108 that the examination of the switch FOOT on the operating board 4 turns out to be an off condition, the program proceeds to S109 and S110 where the foot mode is terminated. Specifically, at S110, a command is applied to the solenoid driver Drv2 to deenergize the solenoid So(1 to thereby close the damper DMP1, thus interrupting a communication between the air mix chamber MIX and the air duct DCT2. The flag F2 which indicates the condition of the damper DMP2 is set to "1" at this time, preventing a subsequent repeated control. Then, the program proceeds to S150 in the flowchart shown in FIG. 9e where the switch DEF on the operating board 4 is examined. If the switch DEF is on, the program proceeds to S151 and subsequent steps to establish the defroster mode.

As mentioned previously, in the defroster mode, the damper DMP1 is closed while the damper DMP3 is opened, establishing a communication between the air mix chamber MIX and the air duct DCT3. Thus, if the flag F1 indicating the condition of the damper DMP1 is reset to "0", a command is applied to the solenoid driver Drv2 to energize the solenoid Sol1 at S152, thus closing the damper DMP1. If the flag F3 indicating the condition of the damper DMP3 is reset, a command is applied to the solenoid driver Drv2 to energize the solenoid Sol3 at S154, thus opening the damper DMP1. The flag F1 is set at S152 and the flag F3 is set at S154, whereby S152 and S154 are skipped over once the defroster mode has been established.

If it is found at S150 where the switch DEF on the operating board 4 is examined that this switch is off, the program proceeds to S155 and S156 where the foot mode is terminated. Specifically, a command is applied to the solenoid driver Drv2 to deenergize the solenoid Sol3 at S156, thus closing the damper DMP3 to interrupt the communication between the air mix chamber MIX and the air duct DCT3. The flag F3 indicating the condition of the damper DMP3 is then reset, preventing a subsequent repeated control.

The switch F/C on the operating board 4 is examined at S157. If this switch is on, a command is applied to the solenoid driver Drv2 to energize the solenoid Sol4 at S159, thus turning the damper DMP4 counter-clockwise, as viewed in FIG. 1, and thus establishing the circulation mode in which the blower draws the air within the compartment. However, the operation of S159 is not performed if the flag F4 indicating the condition of the damper DMP4 has been set, since then the circulation mode has been established.

If the switch F/C is off, a command is applied to the solenoid driver Drv2 to deenergize the solenoid Sol4 at S161, turning the damper DMP4 clockwise, as viewed in FIG. 1, to establish the fresh mode in which the blower draws the external atmosphere (as shown in FIG. 1). However, the operation of S161 is not performed if the flag F4 has been reset since then the fresh mode is already established.

Returning to FIG. 8, when all the occupants have got out of the vehicle, the flags FG1 to FG4 are reset during the timer interrupt operation, and the program proceeds from S5 to S10 where the input port R1 is examined. If all the door are closed, the input port R1 assumes an H level. The absence of any occupant and the closure of all the door indicate the non-use condition of the vehicle. However, before boarding the vehicle or during a temporary parking, the air conditioner may be maintained operative in order to maintain a desired temperature within the compartment. To accommodate for this possibility, a standby mode operation is executed. In the standby mode, the dampers DMPa, DMPb, DMPc, DMPf, DMPg, DMPh, DMPi, DMPj, DMPk, DMPl and DMPm are opened while closing the dampers DMPd and DMPe. The drive of these dampers are performed in a manner as mentioned previously. Upon termination of the execution of operation in the standby mode, a command is applied to the relay driver Drv1 to deenergize the relay RL1, thus establishing the standby mode.

As mentioned, in the onboard air discharge system of the invention, a first electrode is mounted on each of a plurality of onboard seats, and a second electrode is also disposed so that part of a personnel seating on each seat on which the first electrode is mounted is interposed between the associated first electrode and the second electrode. A capacitance formed between the first and the second electrode is monitored, and the presence or absence of an occupant is detected for each seat depending on the manner of a change in the capacitance. The air discharge or ejection toward a seat for which the absence of a personnel has been detected is inhibited. In this manner, the efficiency of the air discharge system is reliably improved.

In particular, a change which occurs in the capacitance between the first and the second electrode largely differs between the presence of a personnel and a baggage on a seat, thus enhancing he reliablity with which the presence or absence of a personnel can be detected. By considering the magnitude of a change per unit time of the capacitance as mentioned in the above embodiment, an erroneous detection which may be caused by the influences of temperature, humidity or aging effect can be minimized. The detection of the presence or absence of a personnel in terms of monitoring a capacitance between the first and the second electrode represents a non-contact type, and hence exhibits an excellent durability and a high reliability. In this manner, the invention enables an efficient control over the air ejection based on information representing the presence or absence of a personnel which is obtained with a high reliability.

What we claimed is:

1. An onboard air discharge system comprising:
   two or more seats onboard a vehicle;
   a plurality of air ejection ports corresponding to the seats;
   air producing means;
   an air channel for leading the air produced by the air producing means to each of the ejection ports;
   an occupant detecting means for detecting the presence or absence of an occupant on each of the seats including:
     a plurality of first electrodes mounted on part of each of the seats as insulated from the respective seats;
     a second electrode associated with each of the first electrodes and insulated therefrom and arranged such that at least part of a person present in the seat on which the first electrode is mounted is disposed therebetween;
     means for detecting a capacitance between each of the first electrode and the second electrode and providing first electrical signals representing each of the capacitances;
   processing means including:
     storage means for storing each of the first electrical signals;
     storage update means for causing each of the first electrical signals stored in the storage means to be updated at given time intervals;
     comparison means for producing second electrical signals representing the occupation of each of the seats whenever a difference between each of the first electrical signals developed by the capacitance detecting means and the signal stored by the storage means which is associated with the first electrical signals exceeds a first threshold value; and
     means for setting second threshold values based upon each of the first electrical signals developed during the presence of an occupant and determining the departure of an occupant when each of the first electrical signals decreases below each of the second threshold values which is associated with the first electrical signals; and
   means for blocking an air ejection from the air ejection port corresponding to the seat for which the absence of a person has been detected.

2. An onboard air discharge system according to claim 1 in which the processing means is operative on one of the seats to determine the presence of a person on that seat in response to an increase in the capacitance between the first electrode and the second electrode mounted on the seat and to determine the absence of a person on that seat in response to a decrease in the capacitance.

3. An onboard air discharge system according to claim 2 in which the processing means is operative on one of the seats to determine the presence of a person on that seat when an increase per unit time of the capacitance between the first electrode and the second electrode which are mounted on that seat is equal to or greater than a given value and to determine the absence of a person in response to a subsequent decrease in the capacitance.

4. An onboard air discharge system according to claim 1 in which said means for detecting the capacitance include oscillator means which produces a signal of a frequency which depends on the capacitance between the first and the second electrode.

5. An onboard air discharge system according to claim 4 in which the oscillator means produces a signal of a frequency which decreases in response to an increase in the capacitance between the first and the second electrode.

6. An onboard air discharge system according to claim 2 in which the second electrode comprises the body of the vehicle.

7. An onboard air discharge system according to claim 1 in which said means for blocking comprises valve means disposed in the air channel to control the air flow, and attitude control means for controlling the attitude of the valve means, the attitude control means being operative to bring the valve means interposed in the air channel communicating with the air ejection port corresponding to the seat for which the processing means has determined the absence of a person to an attitude in which the air flow is inhibited and to bring the valve means disposed in the air channel corresponding to the air ejection port which corresponds to the seat for which the processing means has determined the presence of a person to an attitude which enables the air flow.

* * * * *